May 17, 1932. K. F. GALLIMORE 1,858,491
BORING MACHINE
Filed April 7, 1930 19 Sheets-Sheet 1

Inventor:
Keith F. Gallimore
By Chindahl, Parker + Carlson
Attys.

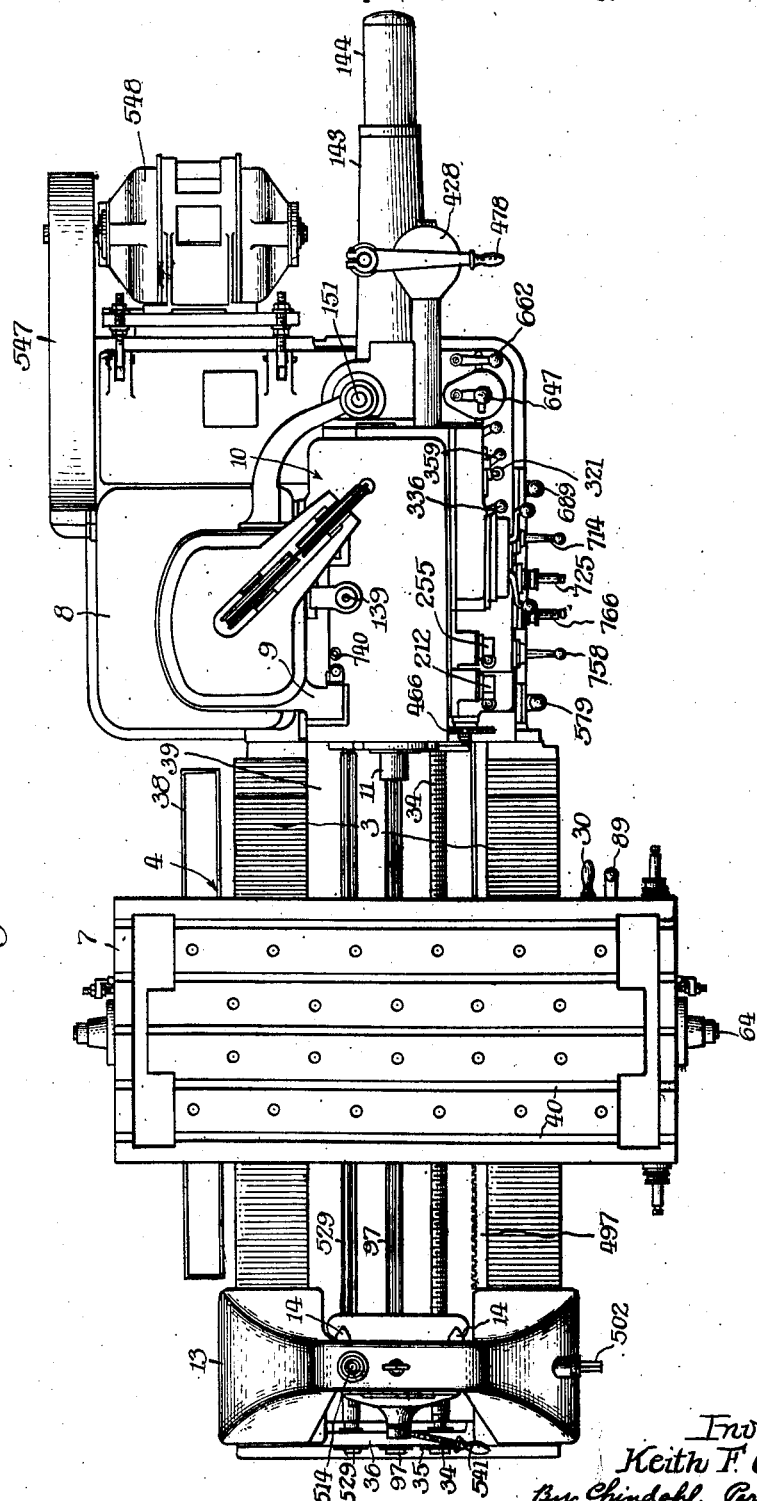

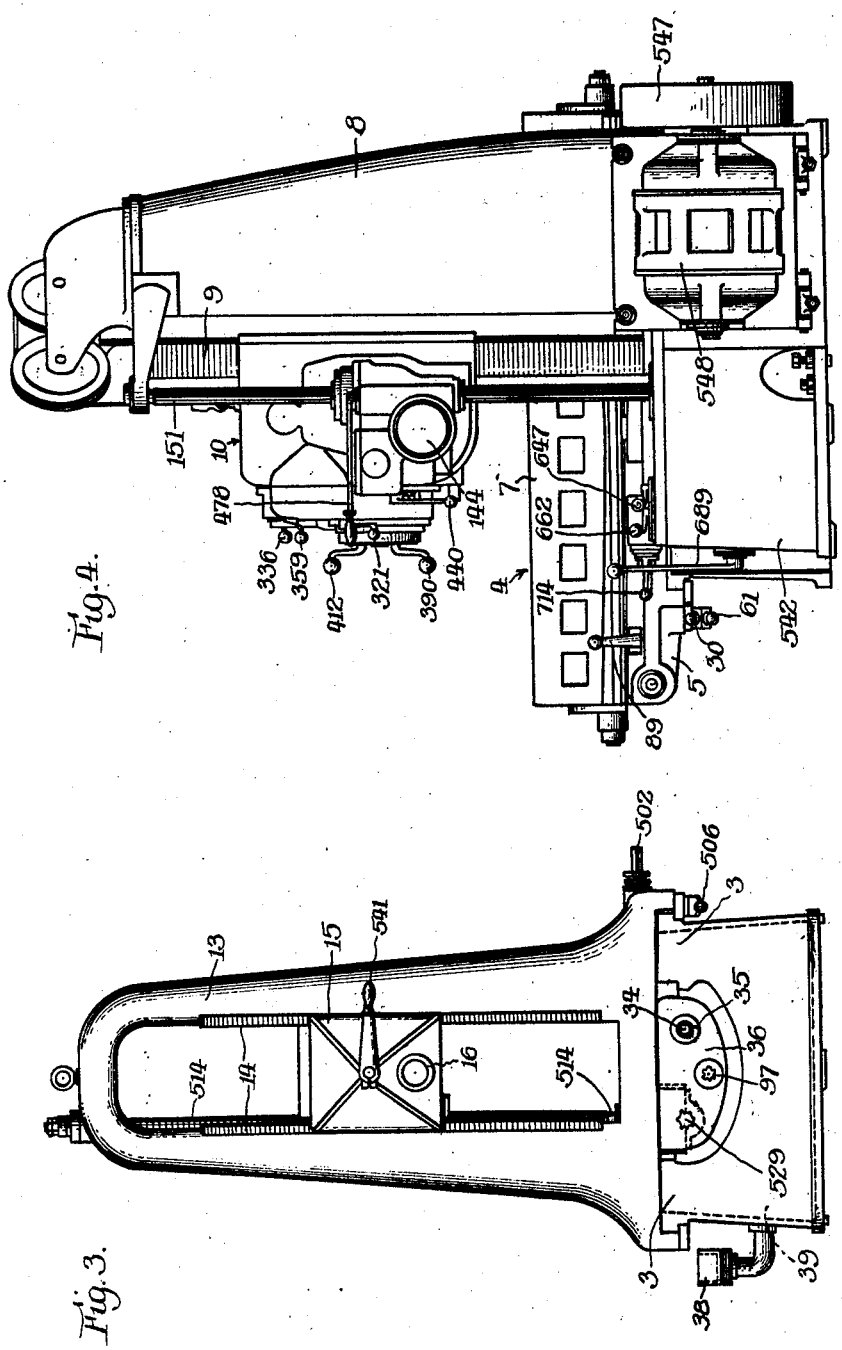

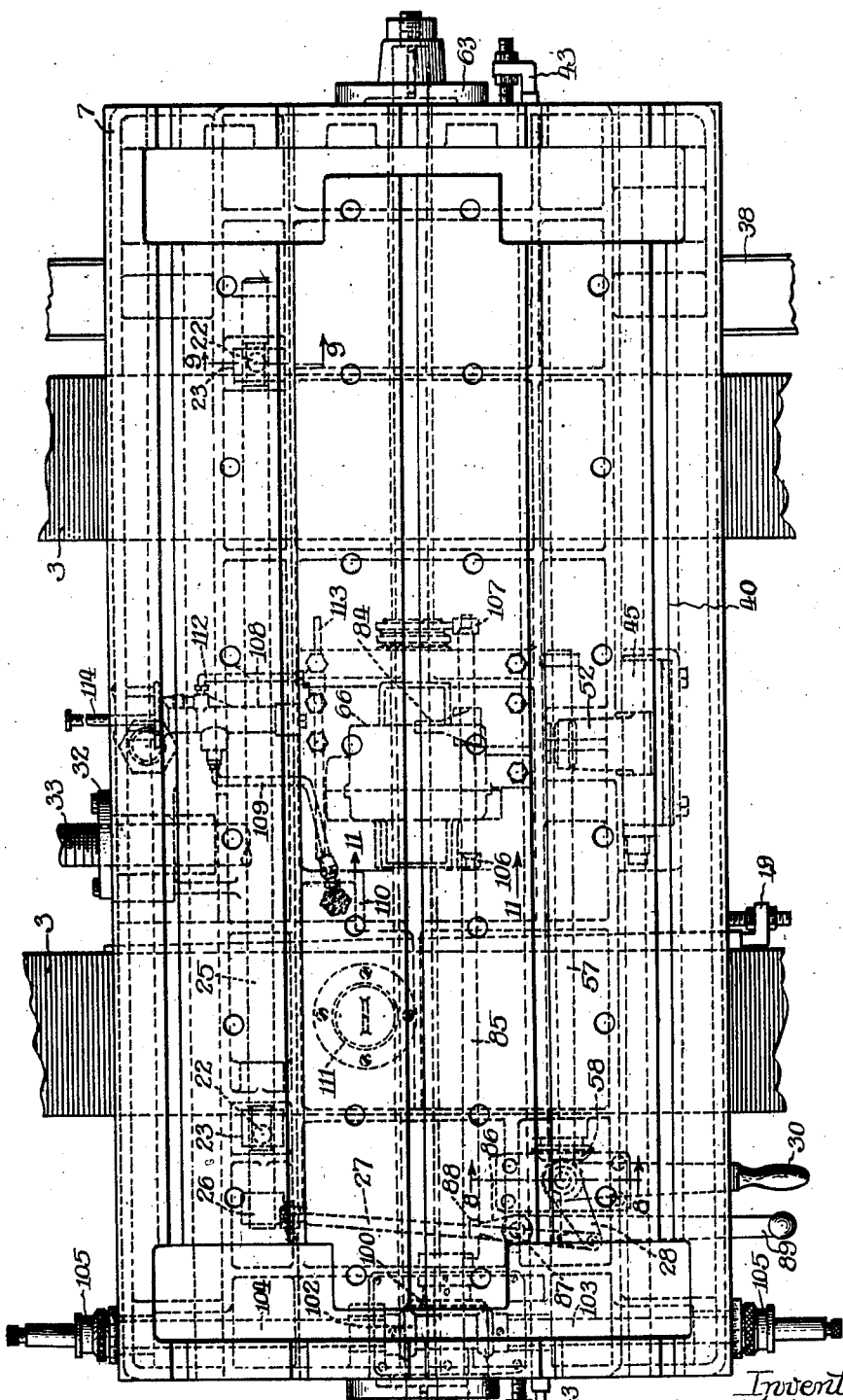

May 17, 1932. K. F. GALLIMORE 1,858,491
BORING MACHINE
Filed April 7, 1930 19 Sheets-Sheet 5
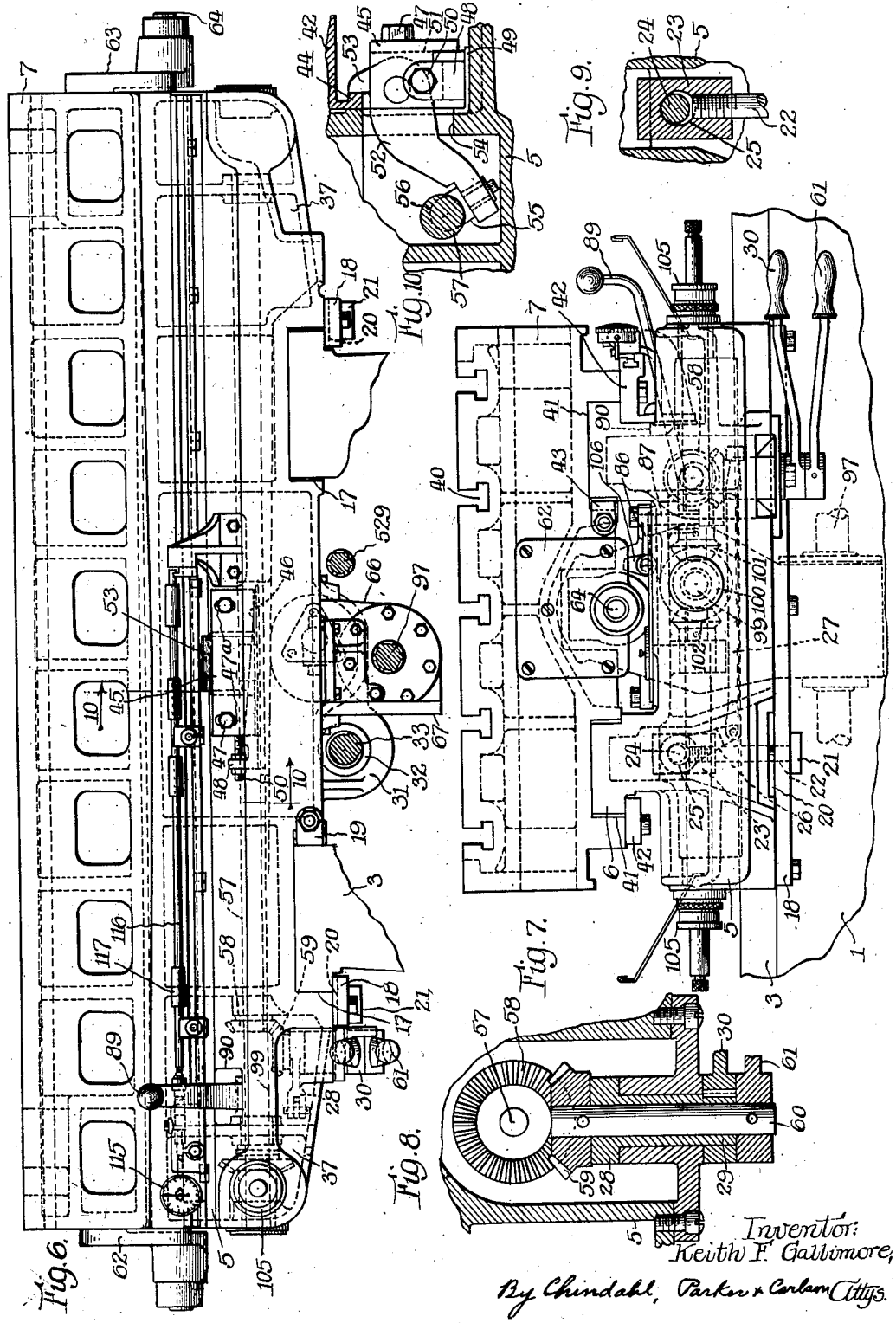
Inventor:
Keith F. Gallimore,
By Chindahl, Parker & Carlson Attys.

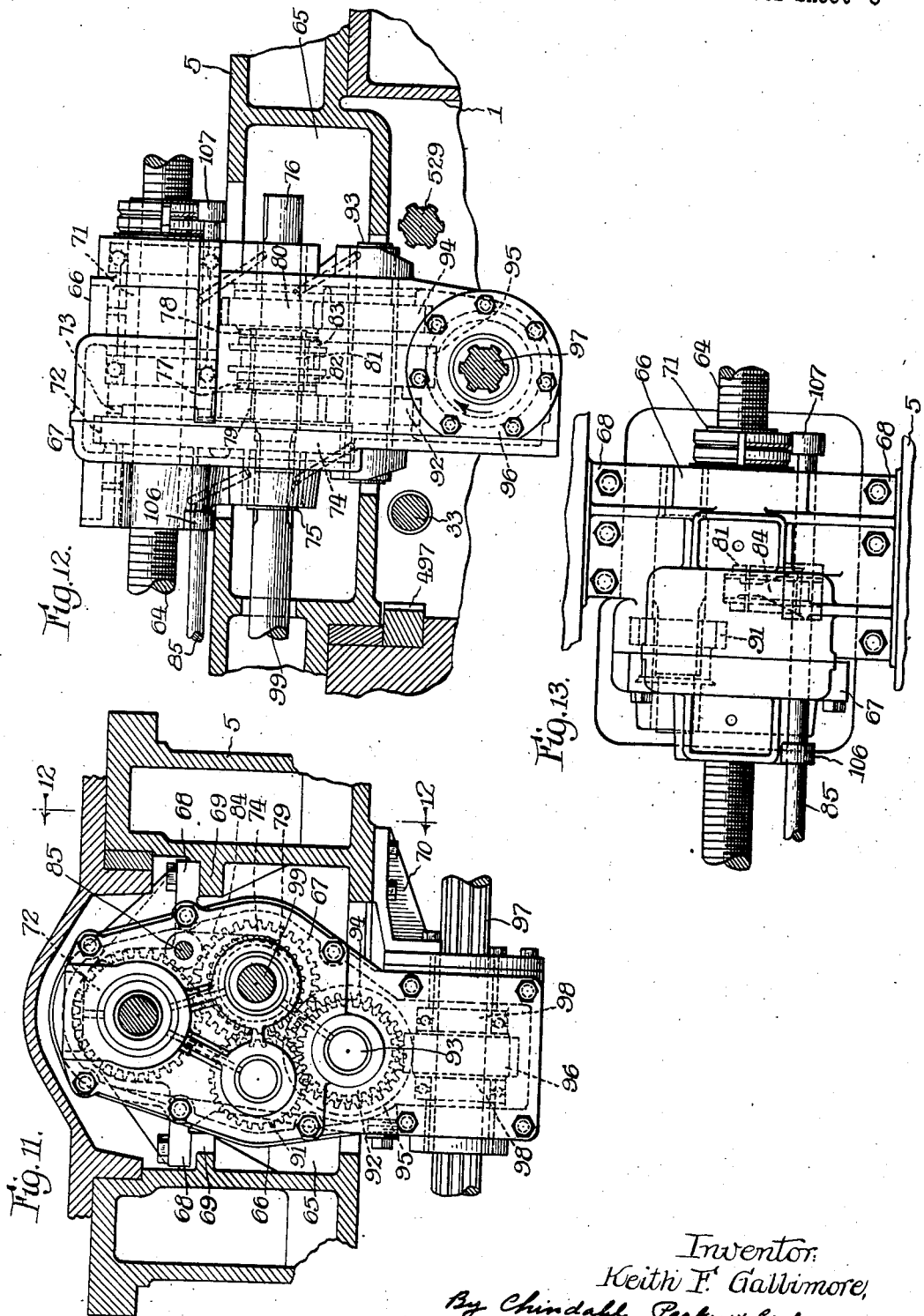

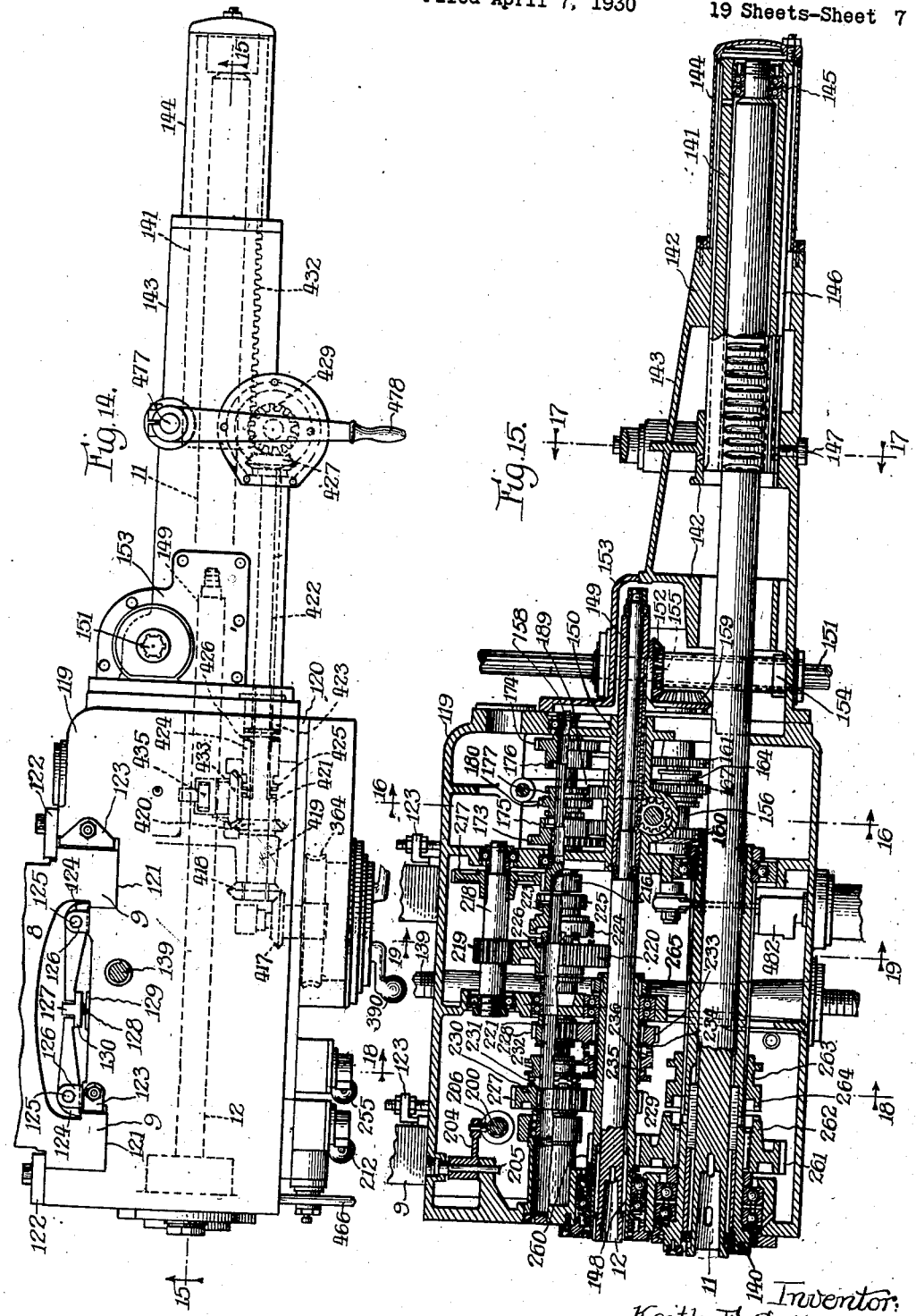

May 17, 1932. K. F. GALLIMORE 1,858,491
BORING MACHINE
Filed April 7, 1930 19 Sheets-Sheet 8
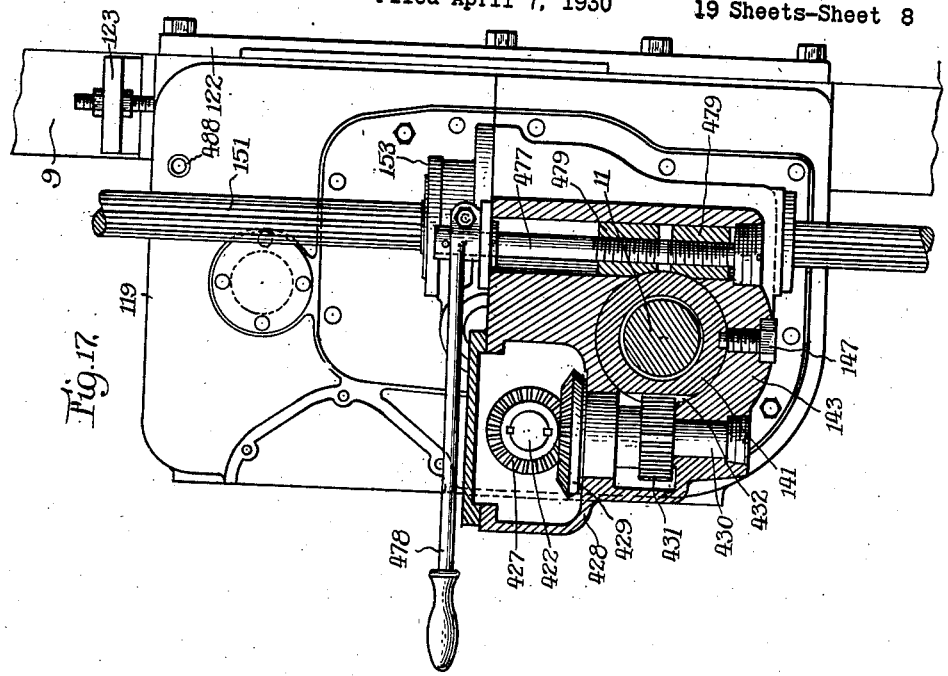
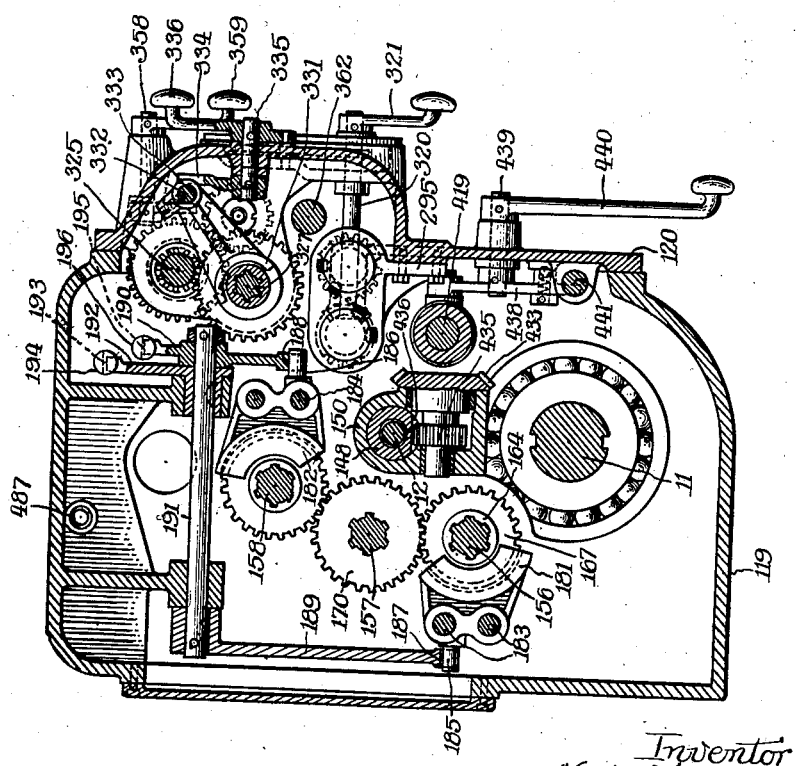
Inventor
Keith F. Gallimore,
By Chindahl, Parker + Carlson
Attys.

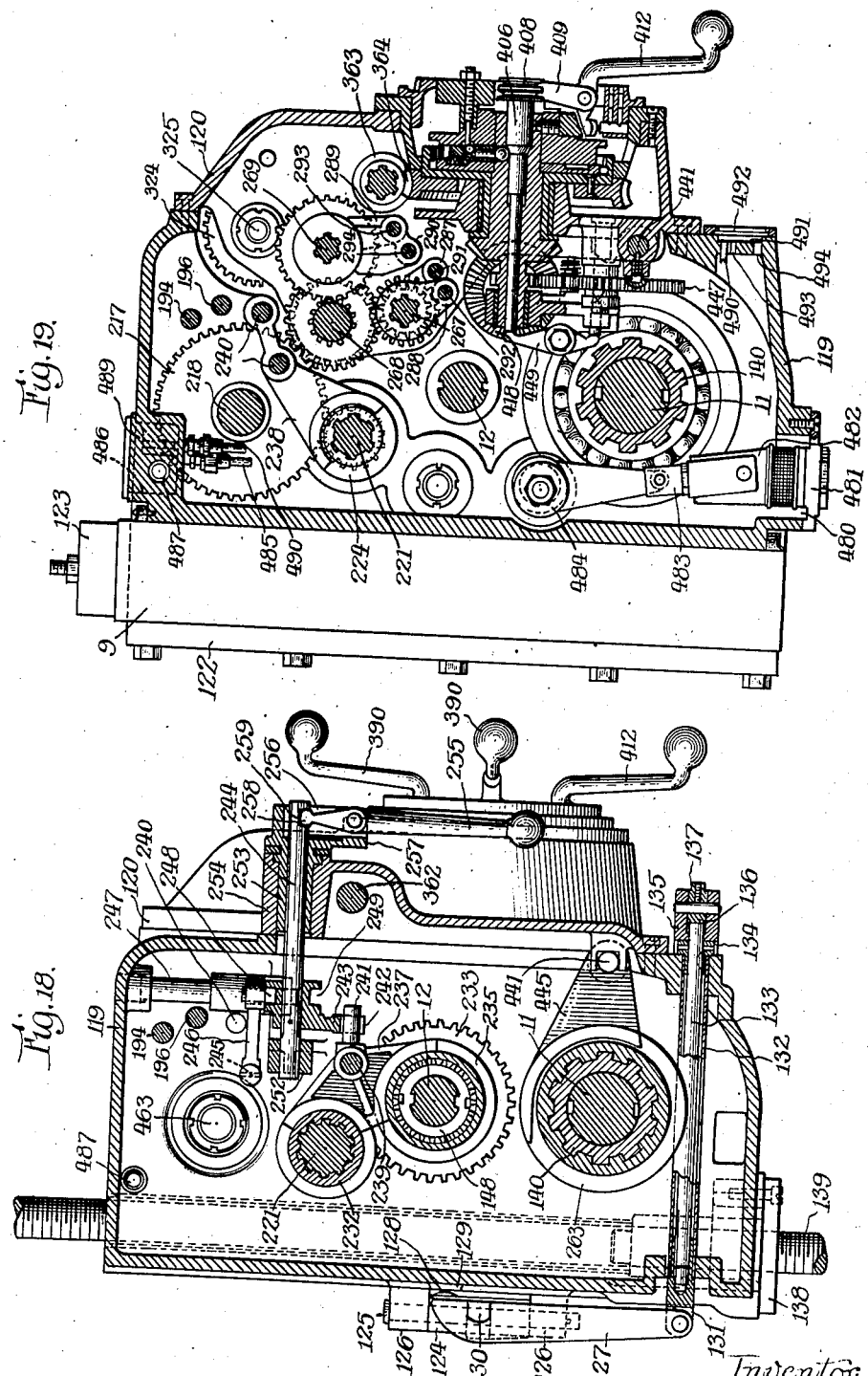

May 17, 1932. K. F. GALLIMORE 1,858,491
BORING MACHINE
Filed April 7, 1930 19 Sheets-Sheet 10
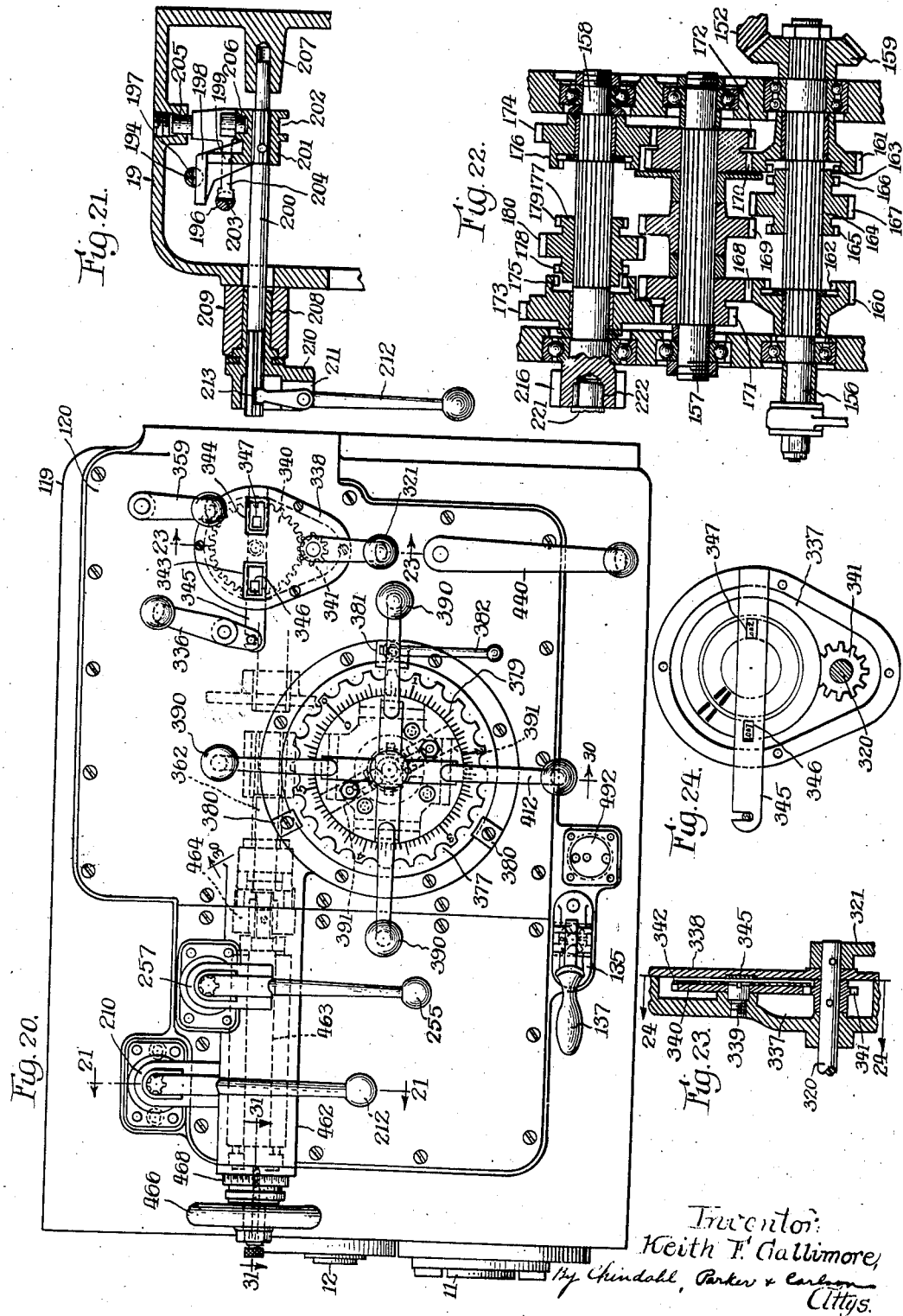

May 17, 1932. K. F. GALLIMORE 1,858,491
BORING MACHINE
Filed April 7, 1930 19 Sheets-Sheet 11
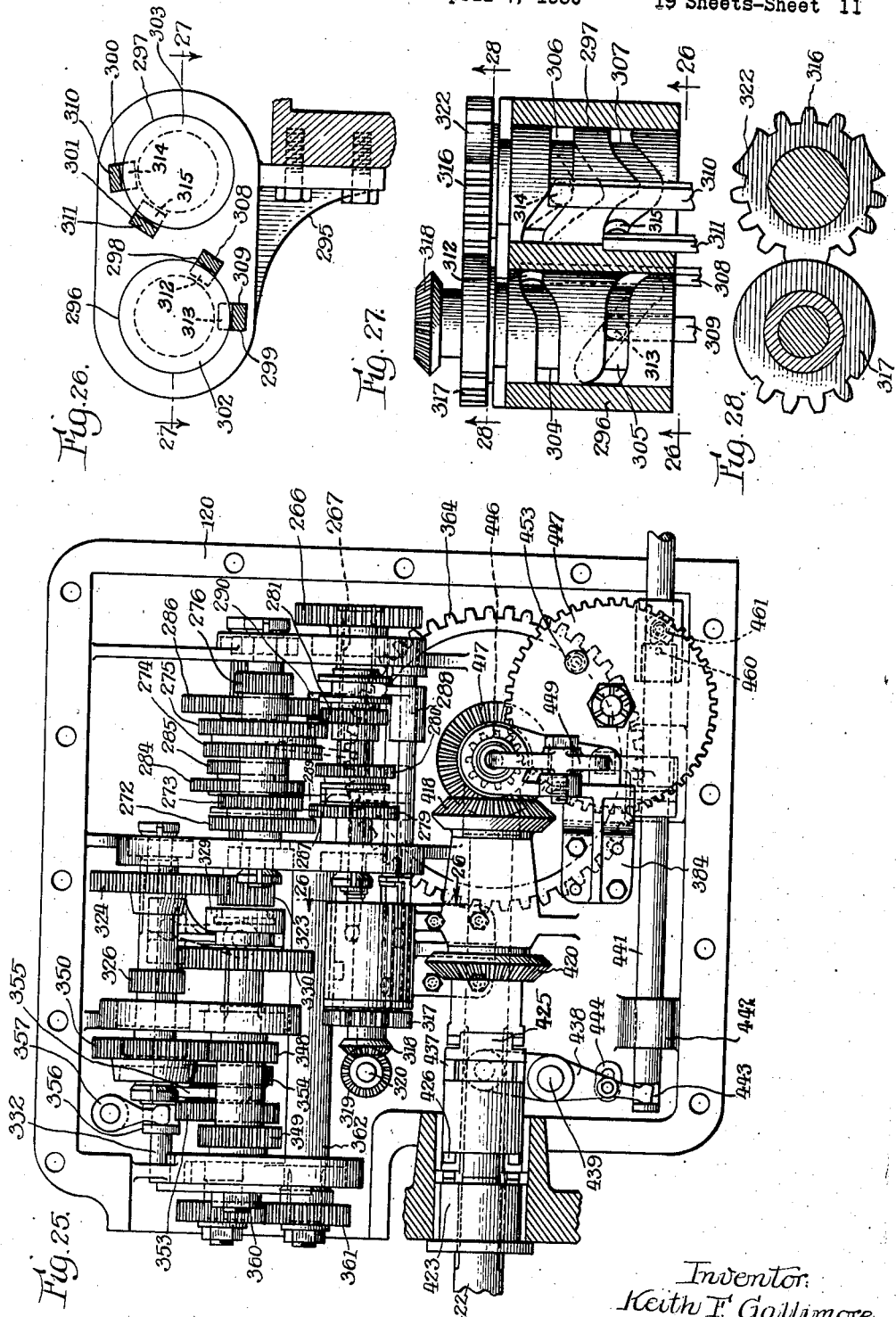

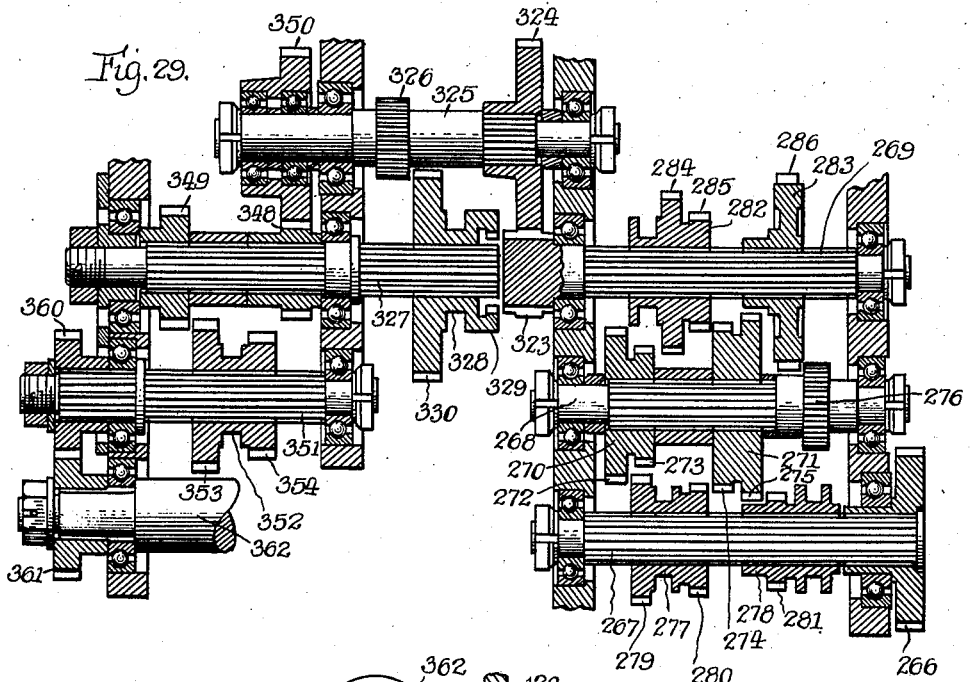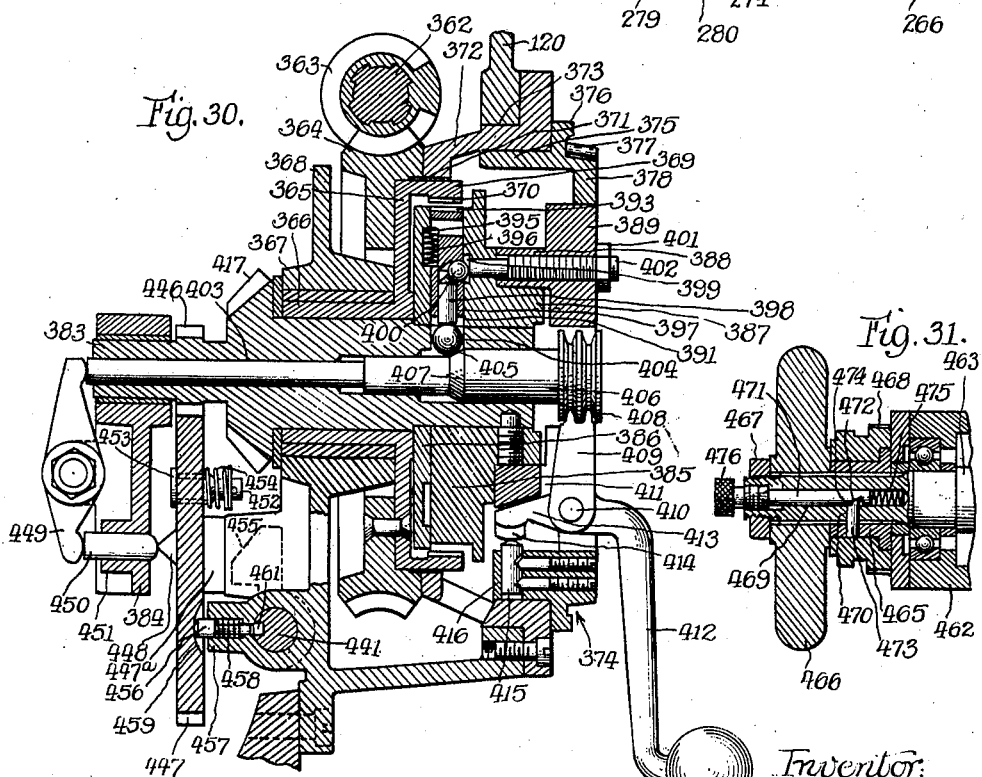

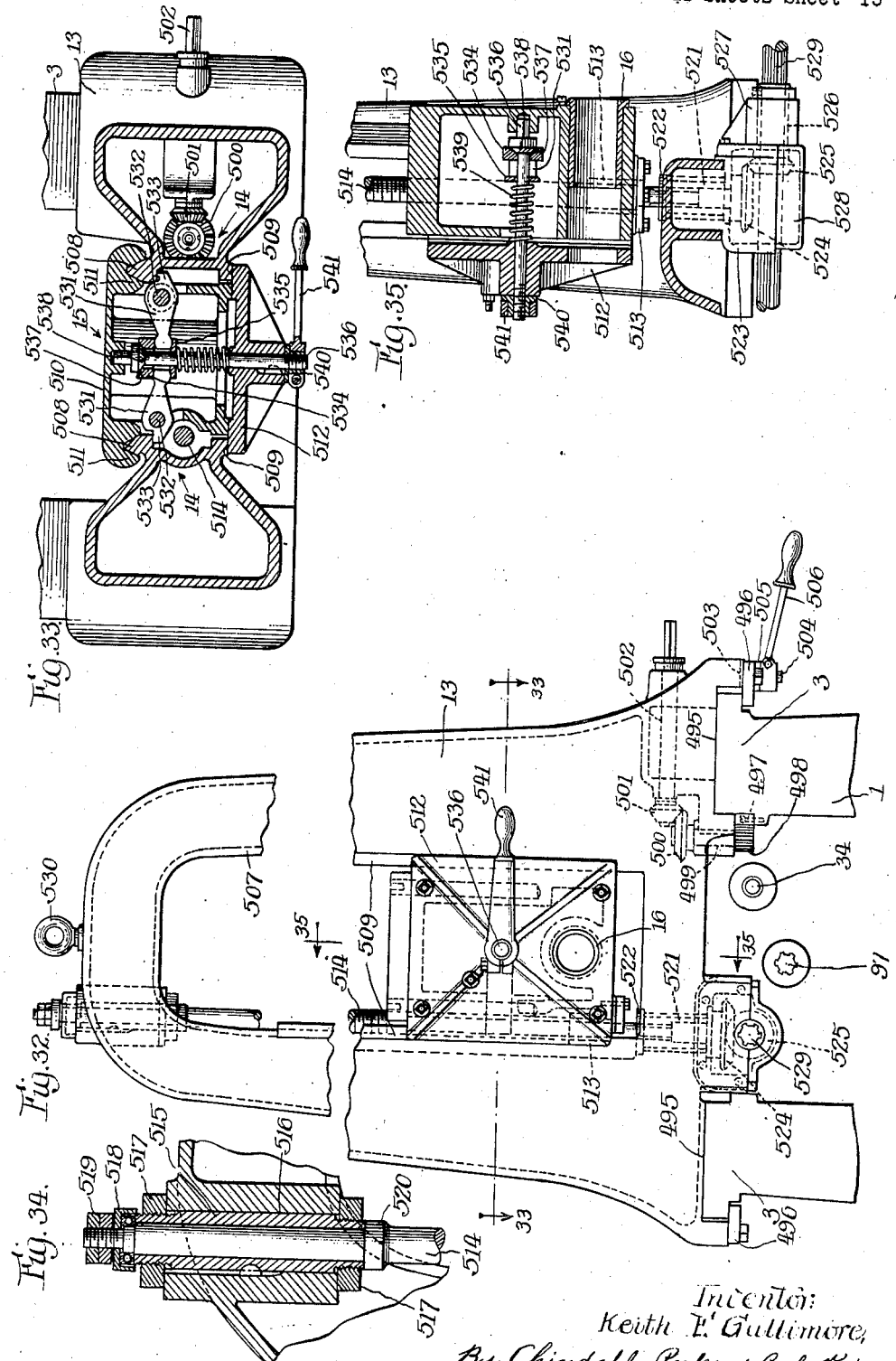

May 17, 1932. K. F. GALLIMORE 1,858,491
BORING MACHINE
Filed April 7, 1930 19 Sheets-Sheet 14
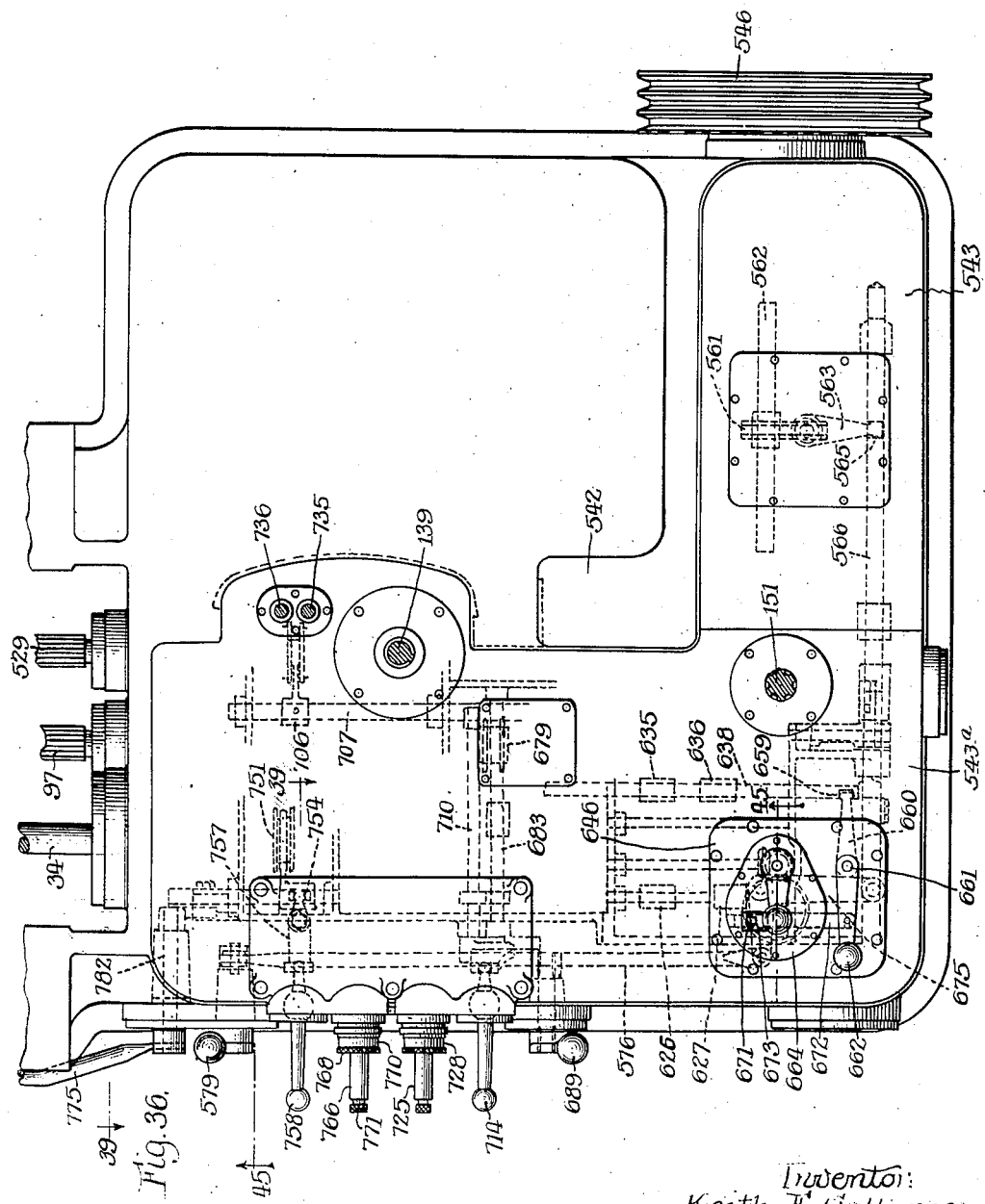

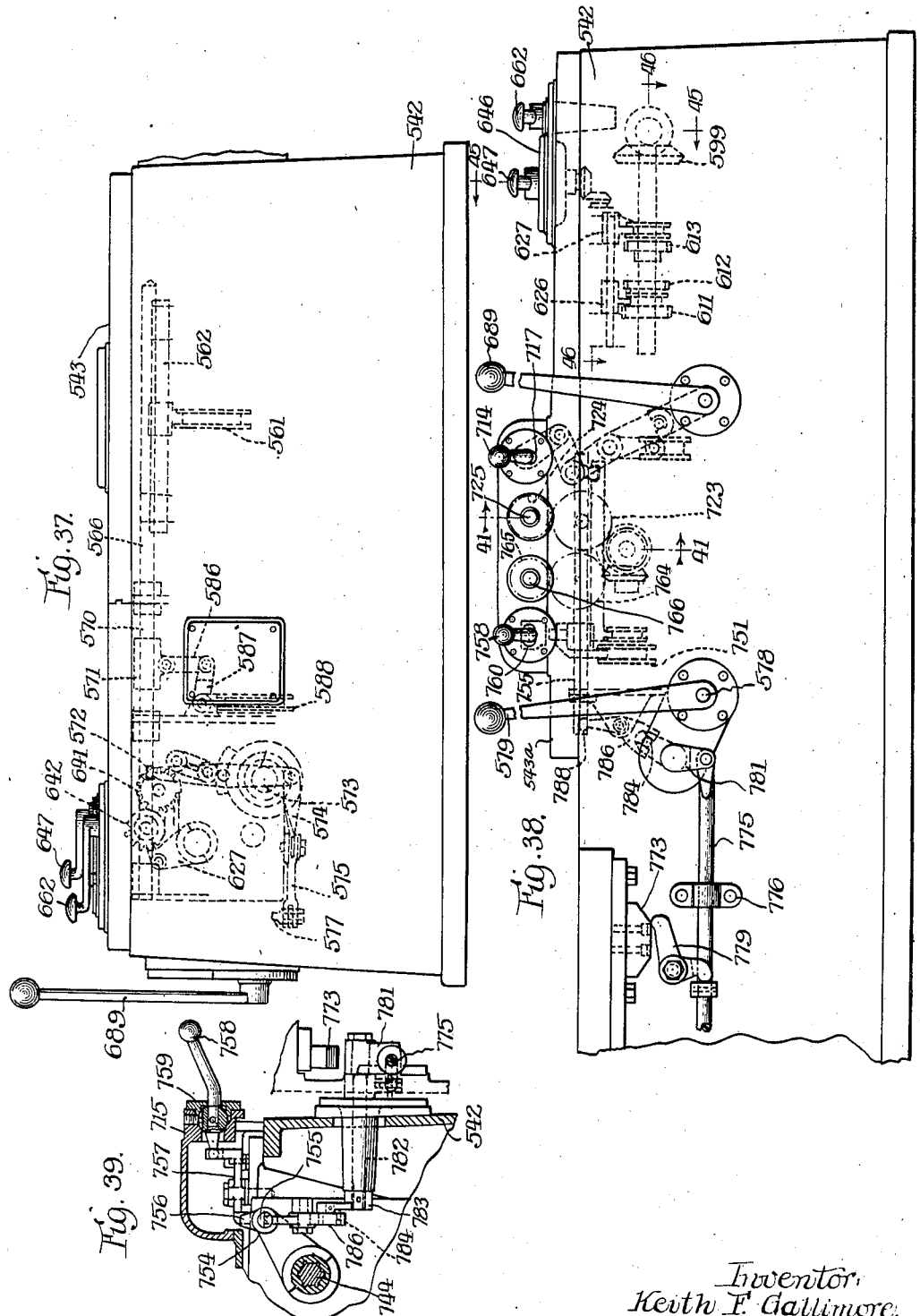

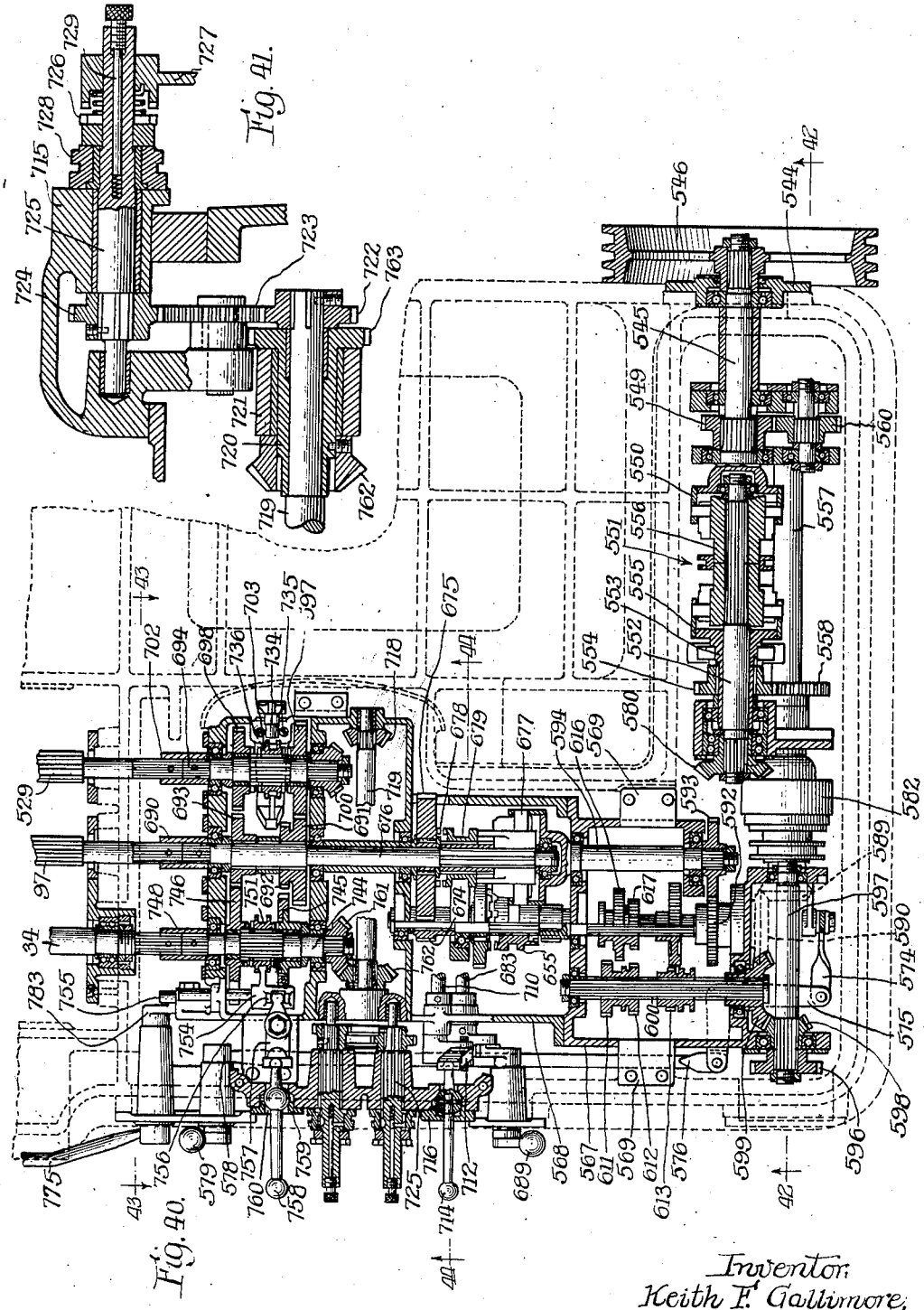

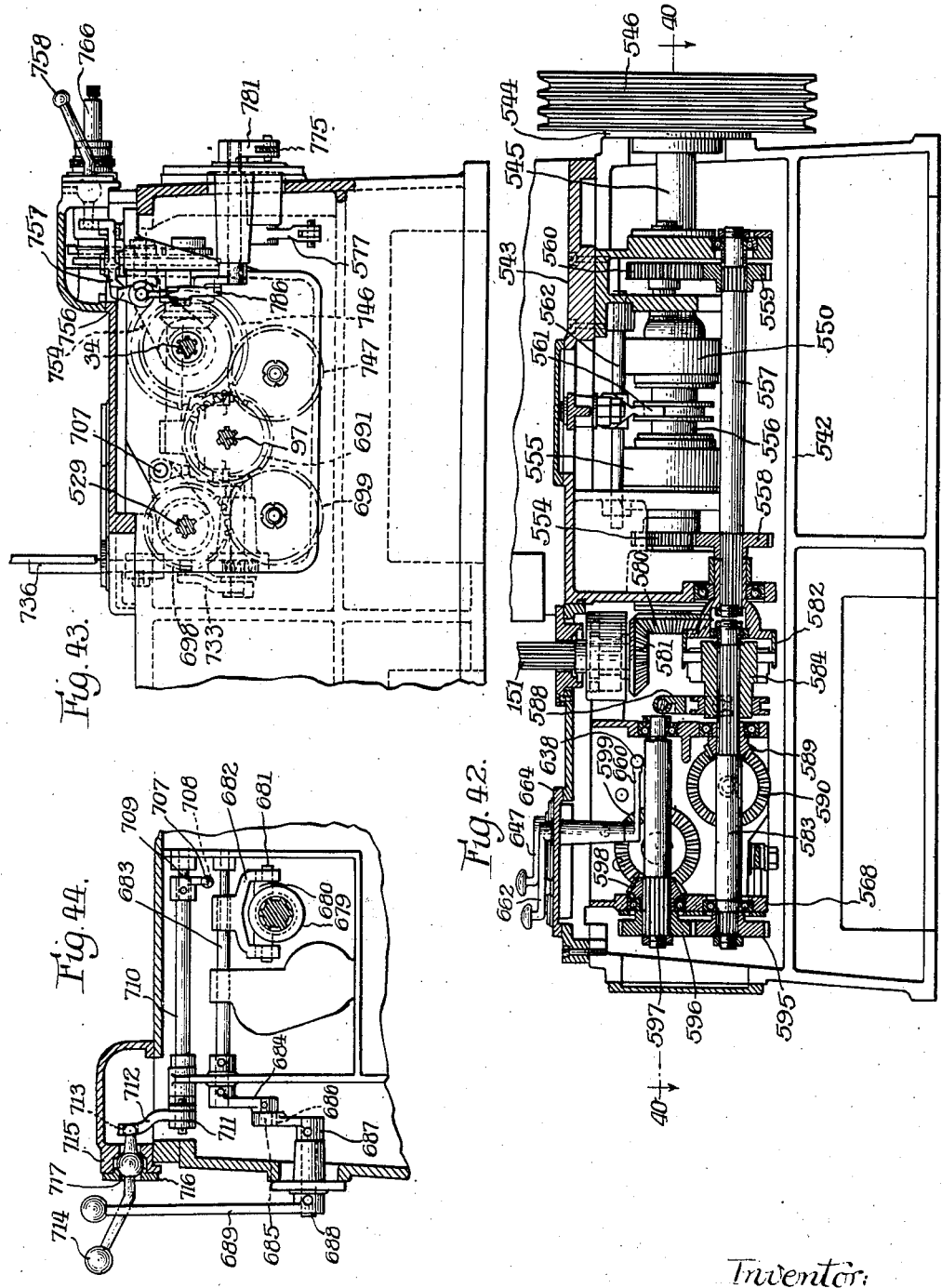

May 17, 1932. K. F. GALLIMORE 1,858,491
BORING MACHINE
Filed April 7, 1930 19 Sheets-Sheet 18
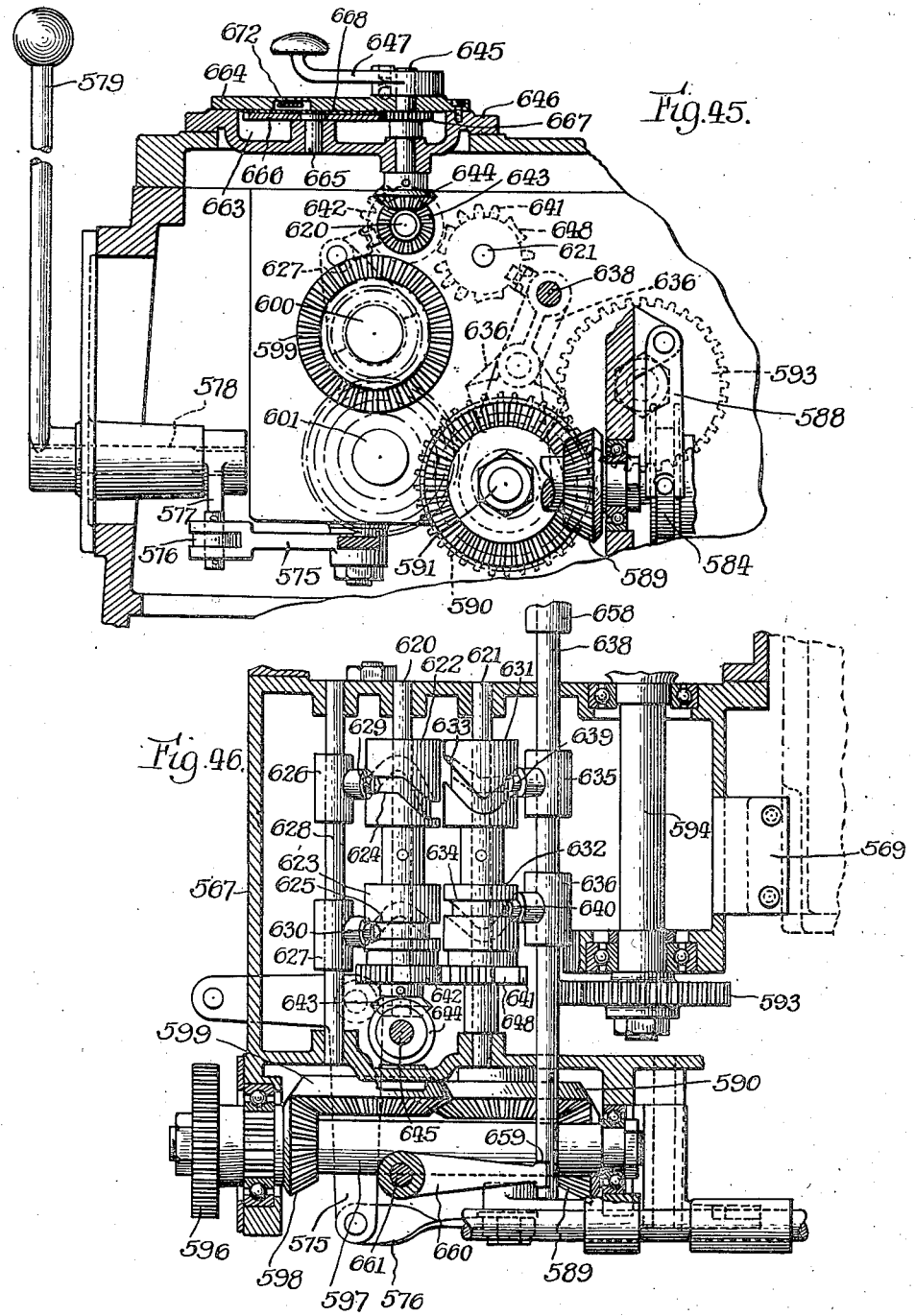
Inventor:
Keith F Gallimore,
By Chindahl, Parker & Carlson
Attys.

May 17, 1932.   K. F. GALLIMORE   1,858,491
BORING MACHINE
Filed April 7, 1930   19 Sheets-Sheet 19
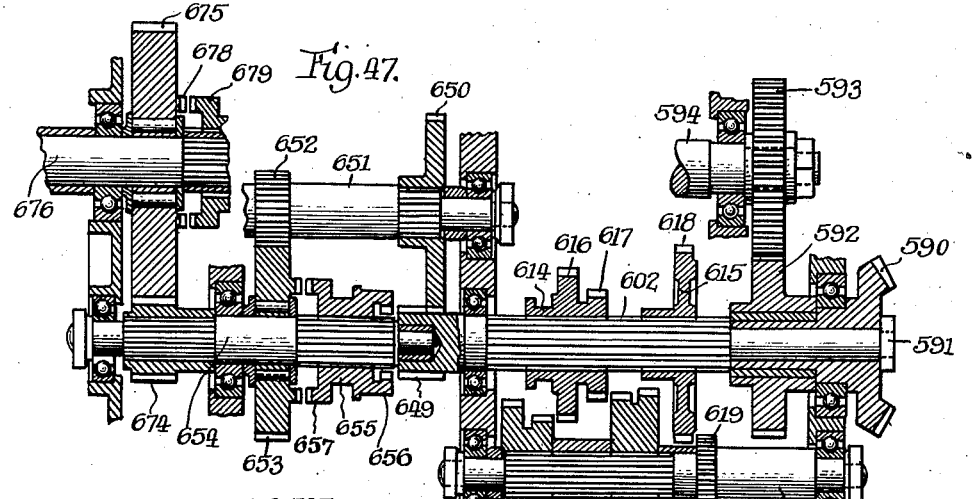
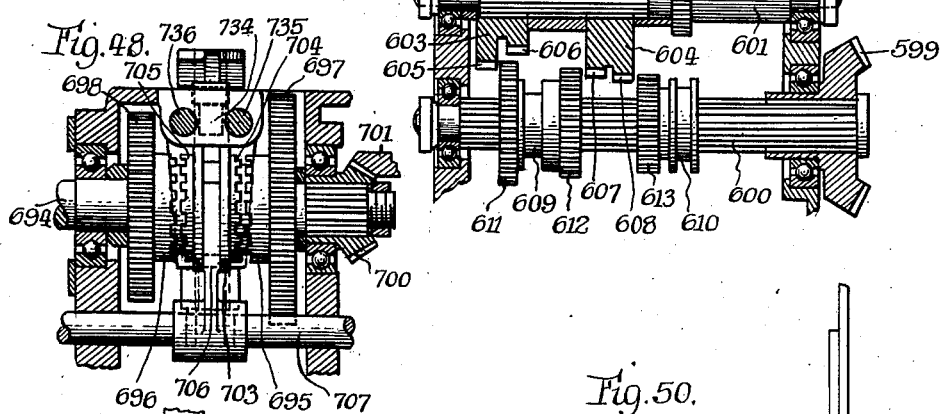
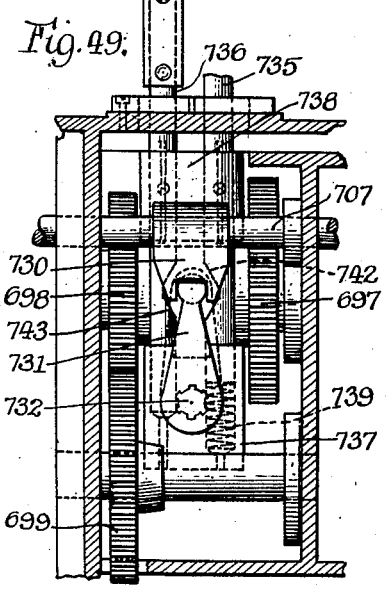
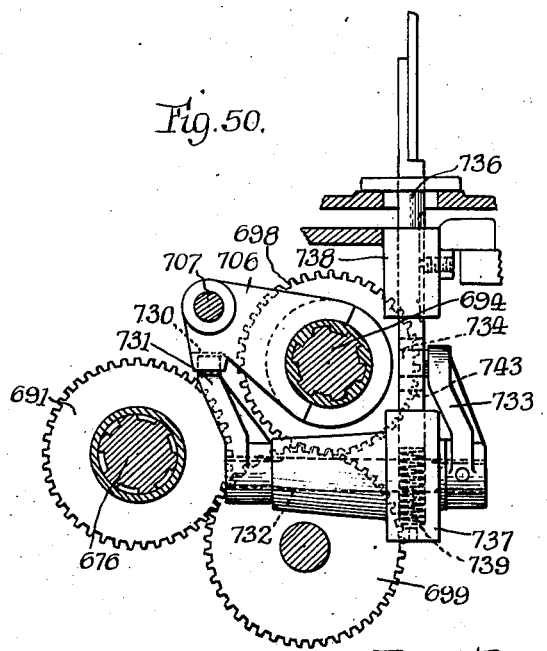
Inventor:
Keith F. Gallimore,
By Chindahl, Parker & Carlson
Attys.

Patented May 17, 1932

1,858,491

UNITED STATES PATENT OFFICE

KEITH F. GALLIMORE, OF FOND DU LAC, WISCONSIN, ASSIGNOR TO GIDDINGS & LEWIS MACHINE TOOL CO., OF FOND DU LAC, WISCONSIN, A CORPORATION OF WISCONSIN

BORING MACHINE

Application filed April 7, 1930. Serial No. 442,055.

The present invention relates to improvements in boring machines, and has particular reference to that type of machine commonly known as a horizontal boring, drilling and milling machine.

Various objects of the invention reside in the provision of a novel horizontal boring, drilling and milling machine in which the work saddle, the work table, the headstock and the end block may be driven independently of each other in direction and speed, and in which the direction control member for each unit is movable by the operator in the same direction as that to be initiated for the unit, thereby increasing the usefulness and adaptability of the machine and simplifying the manual control thereof.

Another object resides in the provision of a machine of the foregoing character comprising a headstock which includes as an integral unit all of the variable speed drives for rotating and feeding the spindle or spindles.

Other objects reside in the provision of a new and improved headstock having a main spindle, an auxiliary spindle from which the rotative drive for the main spindle is taken, and means including interlocks for selectively feeding spindles axially.

Various other objects reside in the provision of novel clamping devices, clutches, clutch interlocks, clutch actuating means, coordinated drive gearing, coolant distributing means, etc.

Ancillary objects and advantages will become apparent as the description proceeds.

In the accompanying drawings, Figure 1 is a front elevational view of a machine embodying the features of my invention.

Fig. 2 is a plan view.
Fig. 3 is a left end view.
Fig. 4 is a right end view.
Fig. 5 is a plan view of the work support.
Fig. 6 is a right side view of the work support.
Fig. 7 is a front end view of the work support.
Fig. 8 is a fragmentary sectional view taken along line 8—8 of Fig. 5.

Fig. 9 is a fragmentary sectional view taken along line 9—9 of Fig. 5.
Fig. 10 is a fragmentary sectional view taken along line 10—10 of Fig. 6.
Fig. 11 is a fragmentary sectional view taken along line 11—11 of Fig. 5 and showing the drive unit for the work table in front elevation.
Fig. 12 is a view taken along line 12—12 of Fig. 11 showing the drive unit for the work table in side elevation.
Fig. 13 is a fragmentary plan view of the control unit shown in Fig. 12.
Fig. 14 is a plan view of the headstock.
Fig. 15 is a longitudinal vertical section through the headstock taken substantially along line 15—15 of Fig. 14.
Fig. 16 is a transverse sectional view taken substantially along the line 16—16 of Fig. 15.
Fig. 17 is a transverse sectional view taken along the line 17—17 of Fig. 15.
Fig. 18 is a transverse sectional view taken along the line 18—18 of Fig. 15.
Fig. 19 is a transverse sectional view taken substantially along the line 19—19 of Fig. 15.
Fig. 20 is a partial front view of the headstock.
Fig. 21 is a fragmentary transverse sectional view taken along line 21—21 of Fig. 20.
Fig. 22 is a development of a nine-speed gearing in the spindle rotative drive.
Fig. 23 is a detail sectional view taken along line 23—23 of Fig. 20.
Fig. 24 is a sectional view taken on the line 24—24 of Fig. 23.
Fig. 25 is an inside view of the front cover plate of the headstock, with the parts mounted thereon shown in elevation.
Fig. 26 is a detail view of means for adjusting the change feed gearing, taken substantially along line 26—26 of Fig. 25.
Fig. 27 is a sectional view taken along line 27—27 of Fig. 26.
Fig. 28 is a detail view of the gearing in Fig. 27 taken along the line 28—28 of Fig. 27.
Fig. 29 is a development of the gearing for the spindle feed mounted on the front cover plate of the headstock.

Fig. 30 is an enlarged sectional view taken substantially along line 30—30 of Fig. 20.

Fig. 31 is a detail sectional view taken along line 31—31 of Fig. 20.

Fig. 32 is a fragmentary end view of the tailstock.

Fig. 33 is a horizontal sectional view taken along line 33—33 of Fig. 32.

Fig. 34 is a detail sectional view of the mounting for the feed screw for the end support.

Fig. 35 is a fragmentary vertical sectional view taken along line 35—35 of Fig. 32.

Fig. 36 is a plan view of the transmission mechanism at the base of the machine.

Fig. 37 is a right end view of the transmission mechanism.

Fig. 38 is a front elevational view of the transmission mechanism.

Fig. 39 is a fragmentary sectional view taken along line 39—39 of Fig. 36.

Fig. 40 is a horizontal sectional view taken along line 40—40 of Fig. 42.

Fig. 41 is a fragmentary sectional view taken along line 41—41 of Fig. 38.

Fig. 42 is a vertical sectional view taken substantially along line 42—42 of Fig. 40.

Fig. 43 is a sectional view taken substantially along line 43—43 of Fig. 40.

Fig. 44 is a sectional view taken substantially along line 44—44 of Fig. 40.

Fig. 45 is a fragmentary vertical sectional view taken substantially along lines 45—45 of Figs. 36 and 38.

Fig. 46 is a fragmentary horizontal sectional view taken substantially along line 46—46 of Fig. 38.

Fig. 47 is a development of the speed change gearing in the transmission.

Fig. 48 is an enlarged view partially in section of the reversing gearing for the headstock.

Fig. 49 is a front view partially in section of the gearing shown in Fig. 48.

Fig. 50 is a side view partially in section of the gearing shown in Figs. 48 and 49.

Figure 1:
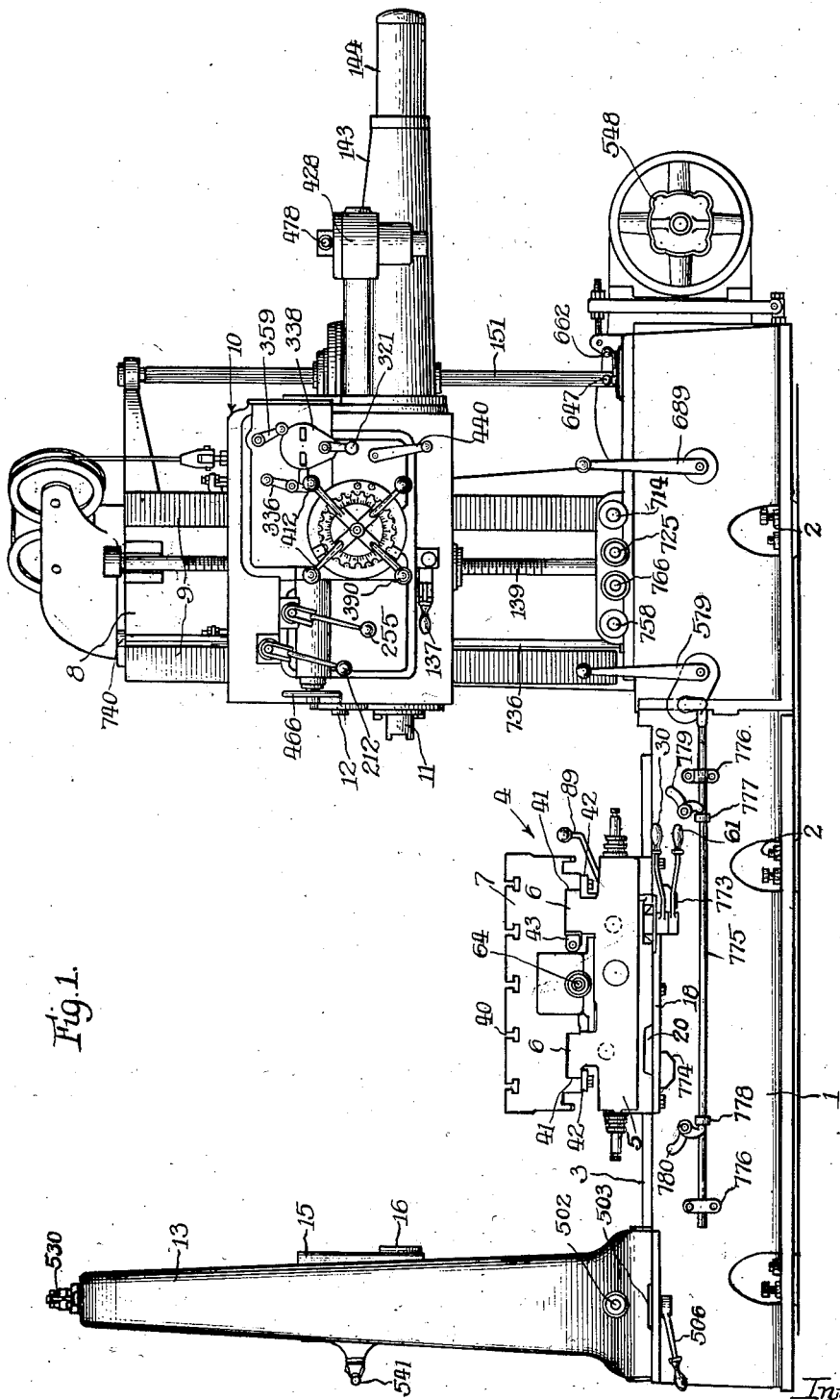

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the machine constituting the exemplary embodiment of my invention comprises a main frame or bed 1. In the present instance, the bed 1 is horizontal, and normally adapted to be supported on a floor to which it may be anchored by means of bolts 2, and is hollow, elongated and generally rectangular in form.

The bed is provided along its upper side edges with suitable longitudinal guides or ways 3 on which a work support 4 is adapted to travel. The work support 4 comprises a saddle 5 in direct engagement with the ways 3 for movement along the bed 1, and provided on the top with horizontal transverse guides or ways 6, and a work table 7 mounted on the ways 6 for movement transversely of the bed.

Rigidly mounted on one end of the bed 1 is an upstanding column 8 provided with vertical guides or ways 9 on which a spindle headstock 10 is adapted to travel. The headstock comprises a main horizontal spindle 11 and a parallel auxiliary spindle 12, both spindles projecting from the side adjacent the work support 4 for the attachment of tools (not shown) adapted to operate on work on the table 7.

Removably and adjustably mounted on the ways 3 on the other end of the bed 1 is an upstanding column or support 13 provided with guides or ways 14 on which an end block or tailstock 15 is adapted to travel synchronously with the head stock 10. The tailstock 15 carries a suitable support 16 adapted to be positioned in axial alinement with the main spindle 11 and to coact therewith in supporting a suitable tool bar or arbor (not shown).

Suitable power drive means, including various adjustable speed transmissions and direction control elements, is provided for the various operable units heretofore described. This means, which will be more fully described hereinafter, in general is available selectively to rotate the spindles 11 and 12, to feed either spindle axially in either direction, to feed the headstock 10 vertically in either direction, to feed the tailstock 15 synchronously with the headstock, to feed the saddle 5 along the bed 1 in either direction, and to feed the table 7 transversely of the bed in either direction, and is further available to effect various combinations of these movements with each feeding movement independent in direction of any other feeding movement.

With the foregoing as a general outline, the various units will now be described in detail.

Work support

The saddle 5 may be of any suitable design, and in the present instance is substantially rectangular in form with parallel recessed guideways 17 (see Fig. 6) in its underside seated on the bed ways 3 which preferably are rectangular in cross-section. Suitable gib plates 18 are secured to the under side of the saddle 5, and engage the undersides of the outer edges of the ways 3 to secure the saddle slidably on the bed 1. A taper gib 19 is adjustably secured in the front guideway 17 in engagement with the rear face of the front way 3.

Means is provided operable at will for clamping the saddle 5 securely in position of adjustment on the bed 1. To this end, the saddle 5 is recessed in the underside of its outer margins along the guideways at one point over each gib plate 18 as indicated at 20 to facilitate upward flexure of the plates into clamping engagement with the undersides of the bed ways 3. Positioned respectively in engagement with the undersides of the gib plates 18 directly under the receses 20 are two clamp plates 21 which are secured to the lower ends of two clamp bolts 22 extending upwardly through the saddle 5 at front and rear. The upper ends of the bolts 22 are secured respectively to two apertured blocks 23 in which two eccentrics 24 are rotatably disposed in peripheral bearing engagement. The eccentrics 24 are formed on a transverse shaft 25 journalled in the saddle 5. A crank arm 26 secured to the front end of the shaft 25 is pivotally connected through a link 27 to a crank arm 28 secured to a vertical sleeve 29 which is rotatably journalled in the saddle 5, and which at its lower end is provided with an operating lever 30 at the front of the bed 1 and below the saddle.

To traverse the saddle 5 along the bed 1, it is formed on its under side and within the bed with a depending lug 31 in which a feed nut 32 is rigidly secured. The nut 32 is in threaded engagement with a feed screw 33 which is formed on a drive shaft 34 for a distance coextensive with the maximum saddle travel. The shaft 34 is rotatably anchored at its left end in a bearing 35 formed in an end bracket 36 secured in the end of the bed 1 underneath the end block support 13, and extends longitudinally through the bed for connection with the power drive.

The front and rear of the saddle 5 are formed with coolant receiving troughs 37 which discharge the collected coolant to a trough 38 at the rear of the machine bed from where it is returned to the supply tank 39, which in the present instance is the interior of the bed 1.

The work table 7 (see Fig. 7) may be of any suitable form, and in the present instance is rectangular in shape and formed on the top with a plurality of longitudinal T-slots 40 for securing the work thereto. The under side of the table 7 is formed with rectangular recessed guideways 41 along its sides which are slidably seated on the saddle ways 6. Gib plates 42 are secured to the under side of the table 7 and engage the under sides of the outer margins of the saddle ways 6 to secure the table thereon. A taper gib 43 is adjustably disposed in each end of the right guideway 41 in engagement with the inner side of the adjacent way 6.

Means is provided operable at will for clamping the table 7 securely in adjusted position on the saddle 5. To this end, the right gib plate 42 is formed with a depending inner marginal flange 44 which bears slidably against the adjacent side wall of the saddle 5. A block 45 having a taper wedge surface 46 on the under side is secured to the side of the saddle 5 midway of its ends and just under the flange 44 by means of bolts 47.

The bolts extend through vertical slots 47$^a$ in the block 45 to permit limited vertical adjustment of the latter. A taper wedge 48 is disposed in bearing engagement between the wedge surface 46 and a horizontal bearing pad 49 on the saddle 5, and is secured to the block by means of a bolt 50 for relative longitudinal adjustment. Pivotally mounted in a central recess 51 in the top of the block 45 is a clamp lever 52 which is formed with a toe 53 movable into clamping engagement with the flange 44 and adapted to flex the latter into tight engagement with the side of the saddle 5. The lever 52 extends through an opening 54 into the interior of the saddle 5, and is provided on its free end with an arcuate shoe 55 engaging an eccentric 56. The latter is mounted on a shaft 57 journalled in the saddle 5 and extending to the forward end thereof. A bevel gear 58 secured to the front end of the shaft 57 meshes with a bevel gear 59 on the upper end of a stub shaft 60 journalled in and extending through the sleeve 29, and the lower end of the shaft 60 is provided with an operating lever 61 underlying the lever 30. The clamping action may be increased by adjusting the block 45 upwardly to increase the leverage, and vice versa.

Rigidly anchored in depending end plates 62 and 63 removably secured to the front and rear ends of the table 7 is a stationary cross feed screw 64 which extends longitudinally through the table between the saddle ways 6, and which passes through a transmission unit for connection to the power drive. The transmission unit is removably mounted as a unitary structure in a central chamber 65 in the saddle 5 (see Fig. 11), and comprises a casing 66 with a removable front cover plate 67. To support the casing 66, it is formed with integral mounting lugs 68 on opposite sides which rest on and are bolted to inwardly extending brackets 69 formed integral with the side walls of the chamber 65. A bracket brace 70 also connects the lower end of the casing 66 to the under side of the saddle 5.

Rotatably journalled in the upper end of the casing 66 is a nut 71 in threaded engagement with the screw 64. A gear 72 is freely rotatable and slidable on the screw 64 in the casing 66 for movement with the nut 71, and is connected through a clutch 73 to the front end of the nut. The gear 72 meshes with a gear 74 having a hub 75 rotatably journalled in the cover plate 67. A stub shaft 76 is journalled in the rear wall of the casing 66, and extends part way through and is splined to the hub 75. Rotatably mounted on the shaft 76 in spaced relation, and formed on their adjacent faces with opposed end clutch elements 77 and 78 are two gears 79 and 80. A clutch sleeve 81 is splined to the shaft 76 between the gears 79 and 80, and has end clutch elements 82 and 83 movable selectively in opposite directions into respective engagement with the clutch elements 77 and 78. A shifter shoe 84 engages the sleeve 81, and is secured to a shifter rod 85 extending to the front end of the saddle 5. A crank arm 86 secured to a vertical rock shaft 87 engages at its free end in a transverse notch 88 in the front end of the rod 85. Also secured to the shaft 87 is an operating handle 89 which projects outwardly through an opening 90 in the side wall of the saddle 5. Rearward actuation of the handle 89 serves to actuate the sleeve 81 in a direction to initiate a rearward feed, and forward actuation thereof establishes the forward feed. The gear 79 meshes through an idler gear 91 with a gear 92 keyed to a stub shaft 93, and the gear 80 meshes directly with a gear 94 on the shaft 93. Secured to the shaft 93 between the gears 92 and 94 is a spiral gear 95 which meshes with a spiral gear 96 splined on a drive shaft 97 extending through and journalled in the lower end of the unit. End thrust ball bearings 98 are provided for the gear 96. The left end of the shaft 97 is rotatably anchored in the end bracket 36, and the right end of the shaft 97 extends along the interior of the bed 1 for connection with the power drive.

Means is provided for feeding the table 7 manually. To this end, a hand feed shaft 99 is keyed at its rear end to the gear hub 75, and is journalled at its front end in the front end of the saddle 5. A bevel gear 100 is secured to the front end of the shaft 99, and meshes with two opposed bevel gears 101 and 102 secured respectively to the inner ends of two alined shafts 103 and 104 journalled respectively in and projecting from opposite sides of the saddle 5 for hand manipulation. The outer end of each of the shafts 103 and 104 is provided with a micrometer dial 105 adapted to be secured thereto at will.

Means is provided for automatically stopping the table 7 at either extreme end of its movement. To this end, a pair of spaced stops 106 and 107 are secured to the shifter rod 85 at opposite sides of the upper ends of the drive unit and respectively in position for engagement by the front and rear end plates 62 and 63 on the table 7.

Mounted in the left side of the saddle 5 intermediate its ends is a suitable oil pump 108 which receives oil through a line 109 from an oil well 110 formed in the top of the saddle and provided with a cover 111. The pump 108 discharges through a line 112 to various header lines 113 which discharge oil to the various bearings in the saddle and table. The pump 108 is operable manually by means of a push rod 114.

Gage means is provided for indicating the position of the table 7. This means comprises a dial gage 115 (see Fig. 6) mounted on the right side of the table 7, a micrometer, and a series of end alined gage rods 116 mounted in supporting guides 117 on the saddle 5.

Headstock

The head stock 10 comprises a casing 119 of suitable form closed at the front by a removable cover 120, and formed in the rear with parallel spaced guideways 121 embracing the rectangular ways 9 on the column 8. Removably secured to the rear of the casing 119 and overlapping the rear outer edges of the ways 9 are two fixed outer gib plates 122. Two taper gibs 123 adjustably secured to the casing 119 and in the guideways 121 engage the right side faces of the ways 9.

Means is provided operable at will to clamp the headstock 10 in position of adjustment on the column 8. This means (see Figs. 14 and 18) comprises two horizontally alined clamps 124 for respectively engaging the inner rear faces of the ways 9. The clamps 124 are mounted respectively on two vertical pintles 125 rotatable in two sets of vertically alined bearing lugs 126 projecting rearwardly from the casing 119, and have inner ends extending toward each other to substantially a medial plane.

A vertical lever 127 is formed at its upper end with a bearing dome 128 engaging a surface or boss 129 on the rear wall of the casing 119 and constituting the fulcrum, and has side flanges 130 near its upper end underlying the free inner ends of the clamps 124. The lower end of the lever 127 is pivotally connected in the rear end of a sleeve 131 slidably mounted in the rear wall of the casing. The sleeve 131 is loosely disposed in the rear end of a tube 132 extending through the casing 119 from front to rear. A slide rod 133 is loosely threaded at its rear end into the inner end of the sleeve 131, and at its forward end extends through and is keyed to a flanged sleeve 134 loosely disposed in the forward end of the tube 132. The flange of the sleeve 134 is exposed and recessed for the reception of an instrument (not shown) whereby it may be rotatably adjusted to adjust the rod 133 axially relative to the sleeve 131 and thereby to adjust the force of the clamping action. The sleeve 134 is held in axial position by an overlying plate or bracket 135 removably secured to the front of the casing 119. An eccentric 136 having an adjusting handle 137 is rotatably secured in the bracket 135 in engagement with the front end of the rod 133. It will be evident that the eccentric 136 is available to shift the rod 133 and thereby to urge the clamps 124 tightly against the ways 9.

The vertical power feed for the headstock 10 comprises a nut 138 (see Fig. 18) rigidly mounted in the lower wall of the casing 119, and a vertical feed screw 139 in threaded engagement with the nut, and extending through the casing to the top of the column 8 where it is rotatably anchored. The lower end of the screw 139 is adapted for connection to the power drive.

The main spindle 11 and the auxiliary spindle 12 are mounted in parallel superimposed relation in the casing 119, and project through the left side wall, the projecting end of each spindle being shown with the usual taper socket for the reception of a cutting tool (not shown).

In the present instance, the left end of the main spindle 11 extends through and is splined longitudinally in a sleeve 140 suitably journalled in the casing 119, and the right end extends freely through a ram 141 slidably disposed in slide bearings 142 formed in an elongated tapered guide sleeve 143. The latter is secured to the right end of the casing 119 and constitutes a continuation thereof. A cylindrical shell 144 closed at its outer end is removably secured to the free end of the sleeve 143 to close the latter. Preferably, the outer end of the spindle is mounted and secured endwise in ball bearings 145 in the right end of the ram 141. The latter is formed with a longitudinal spline groove 146 which engages a spline pin 147 projecting into the intermediate bearing 142.

The auxiliary spindle 12 at its left end also extends through and is longitudinally splined in a sleeve 148 suitably journalled in the casing 119. The other or inner end of the spindle 12 is reduced in size, and extends freely through and is journalled in an elongated guide sleeve 149 which constitutes a feed ram. The latter is slidably mounted in a fixed elongated bearing 150 in the casing 119 and in retracted position extends partially into the inner end of the sleeve 143.

The headstock is a self-contained unit including speed-change means for rotating the spindles 11 and 12 and for feeding them axially. The power inlet comprises a vertical spindle drive shaft 151, the lower end of which extends to the base of the column 8, and the upper end of which is splined and extends through the sleeve 143 to a suitable anchor at the top of the column.

Slidably keyed to the shaft 151 within the sleeve 143 is a bevel gear 152. The latter is formed with an upwardly extending hub suitably journalled in a removable cover 153 on the top of the sleeve 143. A sleeve 154 removably mounted in the lower wall of the sleeve 143 and extending upwardly into a central circular recess 155 in the lower face of the gear 152 loosely encloses the shaft 151 to provide protection from grit, dirt and other foreign matter.

The bevel gear 152 connects with a speed-change unit suitably mounted in the main head-stock casing 119. In the present instance, this unit is adjustable to provide nine selective speeds, and to this end comprises a lower stub shaft 156, an intermediate idler shaft 157, and an upper stub shaft 158. (See Figs. 15 to 19 and 22.)

The lower shaft 156 has keyed to its outer end a bevel gear 159 in mesh with the gear 152. A pair of spaced gears 160 and 161 are freely rotatable on the shaft 156, and are formed in their adjacent end faces with internal gear clutch elements 162 and 163 respectively. Slidably splined to the shaft 156 intermediate the gears 160 and 161 is a clutch sleeve 164 which is formed on its ends with gear clutch elements 165 and 166 adapted to coact respectively with the elements 162 and 163, and which also is formed intermediate its ends with a gear 167.

Removably secured in spaced relation on the intermediate shaft 157 (see Fig. 22), and when assembled in effect rigid therewith are three gears 168, 169 and 170. The end gears 168 and 170 are constantly in mesh with the lower gears 160 and 161, and the intermediate gear 169 is adapted to mesh with the lower gear 167 when the clutch sleeve 164 is in its intermediate position. Formed integral with the gears 168 and 170 are two gears 171 and 172 respectively.

Two end gears 173 and 174 rotatable on the upper shaft 158 mesh constantly with the gears 171 and 172 on the shaft 157, and are formed in their adjacent ends with internal gear clutch elements 175 and 176 respectively. Slidably splined to the shaft 158 intermediate the gears 173 and 174 is a clutch sleeve 177 having end clutch elements 178 and 179 adapted to coact respectively with the elements 175 and 176, and formed intermediate its ends with a gear 180 adapted to mesh with the gear 169 when in central position. It will be evident that by joint and selective manipulation of the clutch sleeves 164 and 177, the shaft 158 may be driven from the shaft 156 selectively at nine different speeds.

The clutch shifting means comprises lower and upper shoes 181 and 182 (see Fig. 16) rotatably keyed respectively to the sleeves 164 and 177. These shoes are secured respectively on a plurality of guide rods 183 and 184 slidably mounted in the casing 119, and are provided respectively with lateral pins 185 and 186 engaging in notches 187 and 188 in the free depending ends of two actuating levers 189 and 190. The lever 189 is secured at its upper end to the rear end of a rocker shaft 191. Keyed to the forward end of the shaft 191 is a lever 192 the free end of which projects into a transverse notch 193 formed in a shifter rod 194. The lever 190 is freely pivotal on the forward end of the shaft 191, and has an upper arm which projects into a transverse notch 195 in a shifter rod 196 alongside the rod 194.

The rod 194 (see Fig. 21) is formed on its under side with a second transverse notch 197 which slidably embraces an elongated spline rib 198 on the free end of a lever 199 secured to a master shifter rod 200 extending from the front rearwardly into the casing 119. The lever 199 is formed with a hub 201 having an annular groove 202 in its periphery. Formed in the rear side of the rod 196 is a vertical notch 203 which embraces the free end of one arm of a horizontal bell-crank lever 204 pivotally mounted on a stud 205 depending from the top wall of the casing 119. The other arm of the lever 204 carries a roller 206 which engages in the groove 202.

The rear end of the rod 200 extends slidably into a cylindrical guide boss 207 projecting forwardly from the rear wall of the casing 119. The forward end of the rod 200 extends through and is slidably splined in a sleeve 208 rotatably journalled in a bearing 209 on the front wall of the casing 119.

Formed on the forward end of the sleeve 208 is a depending arm 210 having a longitudinal slot 211 in its front surface. A depending lever 212 is pivotally mounted in the slot 211, and has a rounded upper end engaging in a transverse notch 213 in the under side of the forward end of the rod 200.

It will be evident that upon pivoting the lever 212 in the arm 210, the rod 200 will be shifted axially and will act through the bell crank lever 204, the rod 196, the lever 190 and the shoe 182 to shift the clutch sleeve 177. Suitable detent means (not shown) may be provided for defining the three positions of adjustment for moving the sleeve 177 selectively into its three positions. Likewise, upon swinging the lever 212 laterally of the casing 119, the rod 200 will be rocked, and will thereupon act through the lever 199, the rod 194, the lever 192, the rock shaft 191, the lever 189, and the shoe 181 to shift the clutch sleeve 164. Suitable detent means (not shown) also may be provided in this instance for defining the three different positions of adjustment. Thus, the lever or handle 212 serves as a single manually manipulable means operable upon being swung about two different pivots to effect the selective actuating of two independent speed control clutches.

The left end of the upper shaft 158 is rigid with a gear 216 which constitutes the power outlet of the speed-change mechanism just described. This gear meshes continuously with a gear 217 secured to a parallel stub shaft 218 (see Fig. 15). Also secured to the shaft 218 is a pinion 219 which meshes continuously with a gear 220 freely rotatable on a shaft 221 which is in axial alinement with the gear 216 and which is rotatably mounted in the left end of the casing 119. The free inner end of the shaft 221 projects into a recess 222 in the adjacent end face of the gear 216. Slidably splined to the shaft 221 between the gears 216 and 220 is a clutch sleeve 223 having gear clutch elements 224 and 225 on its ends adapted respectively to coact with the ends of the teeth of the gear 216 and a complementary clutch element 226 formed on the adjacent face of the gear 220. It will be evident that upon bringing the sleeve 223 into engagement with the gear 216, the outlet shaft 158 of the nine-speed gearing will be connected directly to the shaft 221, and that upon shifting the clutch element 225 into engagement with the element 226, this connection will be effected indirectly through the back gears 217 and 219, thereby providing a two-speed gearing in series with the nine-speed gearing.

Respectively rotatable on and keyed to the left end of the shaft 221 are two spaced gears 227 and 228. The gear 227 meshes continuously with a gear 229 integral with the spindle sleeve 148, and is provided with an end gear clutch element 230 adapted to coact with a similar element 231 on a clutch sleeve 232 splined to the shaft 221. The gear 228 meshes continuously with a gear 233 freely rotatable on the spindle sleeve 148, and formed with a gear clutch element 234 on one end. A clutch sleeve 235 is splined to the spindle sleeve 148, and is provided with an end clutch element 236 adapted to coact with the element 234. An integral double shoe 237 engages the two clutch sleeves 232 and 235, and constrains them to move as a unit. The sleeve unit thus may occupy a neutral position to disconnect the power from the spindle sleeve 148, or may connect one or the other of the gears 227 and 228 to the spindle sleeve 148, thereby providing a two-speed gearing in series with the two-speed gearing and the nine-speed gearing previously described. Thus, a total of thirty-six speeds are provided for the spindle sleeve 148.

Means generally similar to the means for adjusting the nine-speed gearing is provided for selectively adjusting the clutch sleeve 223 and the unit comprising the sleeves 232 and 235. This means (see Figs. 18 and 19) comprises the shoe 237 and a shoe 238 engaging the sleeve 223. The shoe 237 is secured to a slidable guide rod 239 and the shoe 238 is similarly secured to two parallel slidable guide rods 240. A transverse pin 241 on the shoe 237 extends slidably through a notch 242 in the lower end of a depending lever 243 secured to a shifter rod 244 extending from the front into the casing. One of the guide rods 240 (see Fig. 18) for the shoe 238 is formed in one side with a vertical notch 245 which embraces the free end of one arm of a bell-crank lever 246 pivotally mounted on a vertical stud 247 depending from the top of the casing 119. The other arm of the lever 246 carries a roller 248 which engages in an annular groove 249 formed in the periphery of the hub of the lever 243. Of the shifter rod 244, the inner end extends slidably through a bearing 252, and the outer end is slidably splined and extends through a sleeve 253 rotatably secured in a bearing 254 in the front removable wall of the casing 119. A control handle or lever 255 is pivotally mounted for movement toward and from the casing 119 in a slot 256 in a depending arm 257 on the outer end of the sleeve 253, and has an upper rounded end 258 engaging in a transverse notch 259 in the under side of the outer end of the rod 244.

It will be evident that upon pivotal movement of the handle 255 in the arm 257, the rod 244 will be shifted axially, and thereupon will act through the bell-crank lever 246, the rod 240 and the shoe 238 to shift the clutch sleeve 223 into either of its three positions. Likewise, pivotal movement of the handle 255 with the arm 257 will rock the rod 244 which thereupon will act through the lever 243 and the shoe 237 to shift the clutch unit comprising the sleeves 232 and 235 into either of its three positions. The handle 255 thus constitutes a single manually manipulable means for independently adjusting either of two distinct speed-change units.

Details of the thirty-six speed gearing, which comprises the series arranged gearings of nine, two and two speeds, in the rotative drive for the spindle 12, and also details of the actuating means therefor are disclosed and claimed in my copending application, Serial No. 591,738, filed February 8, 1932.

Rigid with the spindle drive sleeve 148 (see Fig. 15) is a pinion 260 which meshes with a gear 261 rotatable on the main spindle sleeve 140 and formed with an end clutch element 262. A clutch sleeve 263 is splined to the sleeve 140 and is formed with a clutch element 264 adapted to coact with the element 262 to connect the main spindle 11 to the spindle 12. Thus, the auxiliary spindle 12 is rotated whenever the main spindle 11 is rotated, but can be rotated independently of the main spindle.

Adjustable means is provided for feeding either of the spindles 11 and 12 axially in synchronism with the rotation. To this end, a drive pinion 265 is secured to the inner end of the drill spindle sleeve 148, and meshes with the power inlet gear 266 (see Figs. 25 and 29) of a gear-shift feed mechanism. This mechanism comprises a nine-feed unit mounted on the inside of the cover 120 and having three parallel stub shafts, namely a lower inlet shaft 267, an intermediate shaft 268, and an upper outlet shaft 269.

Secured in spaced relation on the intermediate shaft 268 are two cluster gear elements 270 and 271 comprising respectively gears 272 and 273 and gears 274 and 275, and a third gear 276. Splined for axial movement on the lower shaft 267 are two cluster gear elements 277 and 278 one comprising cluster gears 279 and 280 movable in opposite directions into mesh selectively with the intermediate gears 272 and 274, and the other a gear 281 movable into and out of mesh with the intermediate gear 275. Thus, the gear elements constitute clutch sleeves shiftable to drive the intermediate shaft 268 from the lower shaft 267 at any one of three speeds.

Splined for axial movement on the upper stub shaft 269 are two gear elements 282 and 283, one comprising spaced cluster gears 284 and 285 movable in opposite directions into mesh with the intermediate gears 273 and 274 and the other comprising a gear 286 movable into and out of mesh with the intermediate gear 276. Thus, these gear elements constitute clutch sleeves shiftable to drive the upper shaft 269 from the intermediate shaft 268 at any one of three speeds. Through selective adjustment of the four gear elements 277, 278, 282 and 283, nine different speeds are made available.

To provide means for adjusting the nine-feed mechanism, shifter shoes 287, 288 and 289 are provided respectively in engagement with the gear elements 277, 278 and 282, and a shifter fork 290 embraces the sides of the gear element 283. The shoes 287, 288 and 289 are secured respectively to shifter rods 291, 292 and 293 (see Fig. 19), and the fork 290 is secured to a shifter rod 294 and slides on the rod 293, all the shifter rods being slidably mounted in transverse webs on the inside of the cover 120.

A unitary control device is provided for shifting the rods 291 to 294 selectively and for interlocking these rods in such a manner that only one gear on each of the upper and lower shafts can be brought into mesh with the companion gears on the intermediate shaft 268 at any one time. This device (see Figs. 16 and 26 to 28) comprises a bracket 295 removably secured to the inside of the front cover 120, and formed with two parallel bores 296 and 297. The latter are formed respectively in their peripheral surfaces with peripherally spaced longitudinal grooves 298 and 299, and 300 and 301.

Rotatably disposed in the bores 296 and 297 are two cam drums 302 and 303 formed with longitudinally spaced peripheral cam grooves 304 and 305, and 306 and 307 respectively. Four fingers 308, 309, 310 and 311 respectively connected to the adjacent ends of the shifter rods 291 to 294 and in alinement therewith, are slidably disposed in the grooves 298 to 301, and are provided with pins 312, 313, 314 and 315 projecting into the cam grooves 304 to 307.

The drum 303 is provided on one end with a gear 316. The drum 302 is provided on one end with a mutilated gear 317 adapted to mesh with the gear 316 for one-third of a revolution, and hence to rotate the drum 303 in increments of 120° through one revolution during each three continuous revolutions of the drum 302, and also is provided with a coaxial end bevel gear 318. Meshing with the latter is a bevel gear 319 on an operating shaft 320 which is journaled in the front cover 120 and which has secured thereto a handle 321 lying across the front of the cover.

Both sets of cam grooves are so shaped that upon each complete revolution starting from the initial speed position they will shift the gear elements successively into the second and third speed positions during the first two-thirds of the revolution, and then into the initial speed position during the last third of each full revolution of the drum 303. Thus, the drum 302 may be adjusted into any one of its three speed positions for each speed position of the drum 303. The actuating lever consequently has nine successive speed positions in three revolutions.

To lock the drum 303 in adjusted position during each idle period, the gear 316 is formed on its periphery with three equally spaced concave lands 322 movable consecutively into interfitting bearing engagement with the mutilated portion of the drive gear 317 at the ends of successive adjustments. Thus, the gears 316 and 317 constitute a Geneva motion device.

Secured to one end of the power outlet shaft 269 of the nine-feed mechanism is a gear element 323 which meshes continuously with a back gear 324 fixed on a stub shaft 325. A second back gear 326 also is secured to the shaft 325. Journalled in axial alinement with the shaft 269 is a shaft 327. A shift gear element 328 is splined to the inner end of the shaft 327, and comprises spaced gears 329 and 330 movable selectively in opposite directions into mesh with the gears 323 and 326. Thus the shaft 327 may be driven from the shaft 269 directly through the gears 323 and 329, or indirectly through the back gears 324 and 326. This provides a two-feed mechanism in series with the nine-feed mechanism, thus making available a total of eighteen feeds.

A shifter shoe 331 (see Fig. 16) engages the gear element 328, and is slidable on a guide rod 332 mounted in the cover 120. The shoe 331 is provided with a notched lug 333 which embraces the free end of a lever 334 secured to the inner end of a rock shaft 335 journalled in the cover 120. A control handle 336 is secured to the outer end of the shaft 335, and provides means whereby the feed change may be manipulated.

Means is provided (see Figs. 20, 23 and 24) for indicating directly the rate of axial feed of each of the spindles 11 and 12 per revolution thereof. To this end, the cover 120 is indented to form a recess 337, and the latter is closed by a removable cover plate 338. Pivotally mounted on a stud 339 on the inner wall of the recess 337 is a gear 340 which meshes with a gear 341 on the shaft 320 and bears a speed ratio of 3 to 1 thereto. The gear 340 underlies the cover plate 338, and carries a suitable dial 342 on its front face. This dial is preferably coextensive with the face of the gear, and is provided with four circular scales, two for the main spindle 11 and two for the auxiliary spindle 12. Since the main spindle 11 is driven directly from the auxiliary spindle through the reduction gears 260 and 261 which in the present instance bear a 3 to 1 speed ratio, the dial readings for the main spindle are three times larger than the corresponding readings for the spindle 12. Since two sets of nine feeds each are provided by the back gears subject to selection by the handle 336, one scale for each spindle indicates the readings for one set of feeds. The corresponding readings in the two scales for each spindle are juxtaposed in two concentric rows.

Since nine dial positions are provided, the readings in the scales for the main spindle 11 are alternated with those in the scales for the auxiliary spindle 12 thereby assembling the four scales in two concentric rows of characteristics and locating the corresponding readings for the two spindles at diametrically opposed points on the dial. In the present instance, the large scale for the main spindle 11 is in the outside row, and the large scale for the auxiliary spindle is in the inside row.

The cover plate 338 is formed with diametrically opposed openings 343 and 344 over the scales for exposing respectively the multiplied readings for the main spindle and the auxiliary spindle. To selectively cover one or the other of the two readings for each spindle underlying the openings, a thin slide bar 345 is slidably disposed under the cover diametrically across the dial and across the openings. This bar is provided with two spaced openings 346 and 347 in registration respectively with the openings 343 and 344, and movable from one row of readings to the other. The outer end of the bar 345 is pivotally connected to the speed adjusting handle 336. Thus, the rates of feed for both spindles as adjusted by the control handles 321 and 336 are indicated directly through the openings 346 and 347.

Mounted on the shaft 327 in spaced relation are two gears 348 and 349. The gear 348 meshes continuously with a gear 350 rotatably mounted on one end of the shaft 325. Shiftably splined on a parallel stub shaft 351 is a reversing gear element 352 comprising two spaced gears 353 and 354 movable in opposite directions respectively into meshing engagement with the gears 349 and 350. A suitable shifter shoe 355 engages the gear element 352, and is slidable on the guide rod 332. The shoe 355 has a notched lug 356 which embraces the free depending end of an arm 357 mounted on the inner end of a rock shaft 358 journalled in the cover plate 120. A reversing handle 359 is secured to the outer end of the shaft 358.

Secured to one end of the shaft 351 is a pick-off gear 360 which meshes with a kick-off gear 361 on a shaft 362. The shaft 362 carries a worm 363 which meshes with a worm wheel 364 rigidly mounted on the disk back of a clutch element 365 for rotation therewith. (See Figs. 19 and 30.)

The clutch element 365 comprises a rear hub 366 which is rotatable in a bearing 367 formed in a bracket 368 integral with the inside of the cover 120, and also comprises a front annular flange 369 with inner serrated clutch teeth 370. The flange 369 is rotatably disposed in a circular opening 371 in the inner wall of a clutch housing 372 mounted in a circular opening 373 in the cover 120. A dial ring 374 is rotatably adjustable in a front circular opening in the housing 372, and comprises an annular inner bearing flange 375, an outer peripheral flange 376 bearing against the front face of the housing and formed with a plurality of peripheral thumb notches 377 in its outer margin to facilitate adjustment, and an inner peripheral flange 378 with a graduated feed scale 379 along its inner margin. A pair of spaced clamps 380 are bolted to the housing 372, and overlie the periphery of the flange 376 to hold the ring rotatably in position. A third clamp 381 mounted on the housing 372 is adapted to be tightly clamped against the flange 376 by means of a clamp nut 382 to secure the ring 374 in adjusted position.

Rotatably mounted in the hub 366 and extending therethrough is a shaft 383, the rear end of which is supported in a bearing bracket 384 removably secured to the inside of the cover plate 120. A drum 385 is keyed to the front end of the shaft 383 within the housing 372, and a disk 386 is mounted on the shaft against the inner face of the drum. A hub 387 on the front of the drum 385 fits into an annular flange 388 on the inside of a circular dial plate 389 rotatable within the dial ring 374 and having an indicator point movable along the scale on the ring. Three quadrant handles 390 (see Fig. 20) are suitably mounted in the front of the plate 389 whereby the latter may be manually adjusted.

Two radial grooves 391 (see Figs. 20 and 30) are formed in the inner face of the drum 385 and open from the center to the outer periphery. Slidably mounted in the grooves 391 are two radial clutch jaws 393 having clutch teeth on their outer ends adapted to coact with the clutch teeth 370. Coil springs 395 mounted in opposed complemental recesses 396 in the adjacent faces of the disk 386 and the jaws 393 tend to urge the latter inwardly away from the teeth 370. Suitable means is provided for forcing the jaws 393 outwardly, and to this end, the inner end of each jaw is formed with a longitudinal bore 397 in which a pin 398 pointed on its outer end is adjustably disposed. The outer end of each bore 397 opens laterally through a recess 399 to the drum 385, and a ball 400 is disposed therein in camming engagement with the outer end of the pin 398. Threaded through the plate 389 and extending through the drum 385 and provided with a lock nut 401 on its front end is an adjusting pin 402, the inner end of which engages the front of the ball 400. Adjustment of the pin 402 is effective to adjust the ball 400 across the pointed end of the pin 398 and thereby to adjust the longitudinal position of the latter in the bore 397. The shaft 383 is formed with an axial bore 403 opening therethrough and comprising three sections decreasing progressively in diameter from front to rear, and also is formed with two bores 404 opening radially from the front section of the bore 403 into alined communcation with the inner ends of the grooves 391. Freely disposed in the bores 404 and in engagement with the inner ends of the pins 398 are two balls 405. An actuating plunger 406 extends through the shaft 383 and comprises three sections of different size slidably disposed in the corresponding sections of the bore 403. The inner end of the first plunger section is formed with an annular conical cam face 407 which operatively engages the balls 405, and which is effective upon rearward actuations of the plunger to urge the jaws 393 outwardly into engagement with the clutch element 365. The front end of the plunger 406 is formed with an annular rack 408 which meshes with a gear sector 409 pivotally mounted on a pin 410 in a radial slot 411 in the front face of the dial plate 389. The gear sector is provided with a suitable handle 412 whereby the clutch may be manipulated. Each of the quadrant handles 390 is similarly connected to the plunger 406 so that any one of the handles 390 and 412 may be actuated to open or close the clutch.

To provide means for automatically opening the clutch after a predetermined feed, one gear sector 409 is formed with a rearwardly extending cam arm 413 having a V-shaped knock-out cam 414 on its end. A stop pin 415 is adjustably secured in a radial bore 416 in the ring flange 375, and projects into the path of the cam 414. In operation, the dial ring 374 is rotatably adjusted to the position indicating the depth of feed desired, thus advancing the pin 415 a predetermined distance relative to the cam 414. The handle 412 then is actuated to close the clutch. At the end of the feed, the cam 414 rides onto the inner rounded end of the pin 415, and swings the gear sector 409 to open the clutch.

Formed on the shaft 383 inside of the bracket 368 is a bevel gear 417 which meshes with a bevel gear 418 (see Fig. 25) on a feed shaft 419 suitably journaled in the casing 119. A bevel gear 420 formed integral on one end with an end clutch element 421 is freely rotatable on the shaft 419. A second feed shaft 422 (see Fig. 14) in axial alinement with the shaft 419 and in end bearing abutment therewith extends through and is suitably journalled in the taper sleeve 143, and is provided on its abutting end with a fixed end clutch element 423 opposed to the element 421. Shiftably splined on the shaft 419 is a clutch sleeve 424 having end clutch elements 425 and 426 adapted to coact respectively with the elements 421 and 423 to connect the gear 420 or the shaft 422 selectively to the shaft 419.

The right end of the feed shaft 422 (see Fig. 17) is provided with a bevel gear 427 in a gear housing 428 on the front of the sleeve 143. The gear 427 meshes with a bevel gear 429 on a vertical stub shaft 430. A pinion 431 on the shaft 430 meshes with a longitudinal gear rack 432 formed in the side of the sleeve or ram 141, thus completing the drive connection for reciprocating the main spindle 11.

The bevel gear 420 meshes with a bevel gear 433 on a stub shaft 434 journalled in a bearing formed on the sleeve 150. A gear 435 on the shaft 434 meshes with a longitudinal rack 436 formed along the underside of the ram 149 for the auxiliary spindle 12.

Thus, the clutch sleeve 424 is reversible to connect the power feed to one or the other of the two spindles. To actuate the sleeve 424, a suitable shifter shoe 437 is provided in engagement therewith. The shoe 437 is pivotally mounted in the upper end of a lever 438 secured intermediate its ends on a rock shaft 439 journalled in the front cover 120. An adjusting handle 440 is secured to the front end of the shaft 439.

It will be noted that the auxiliary spindle 12 is rotatable continuously, while the rotative power drive is adapted to be disconnected from the main spindle 11 through actuation of the clutch sleeve 263. Means is provided for disconnecting the rotative drive to the main spindle 11 when the feed is connected to the drill spindle 12, and for connecting this drive when the feed is connected to the main spindle. This means comprises a shifter rod 441 slidably mounted in spaced lugs 442 on the inside of the cover plate 120. The lower end of the lever 438 engages in a transverse notch 443 cut in one side of the rod 441, and also is provided with a spring-pressed ball detent 444 for defining the two extreme positions of adjustment. Secured to the rod 441 is a shifter shoe 445 engaging the clutch sleeve 263.

Means is provided for automatically opening the control clutch 370—393 to disconnect the feed at the extreme ends of travel of each spindle. This means comprises a pinion 446 formed on the shaft 383 and meshing with a gear 447 rotatable on a shaft 447ª.

The gear 447 is driven in synchronism with the feed, and will make one complete revolution in feeding the main spindle 11 from one extreme position to the other. A V-shaped stop cam 448 is mounted eccentrically on the gear 447 and projects from the rear face thereof. Pivotally mounted in the bracket 384 is a vertical lever 449, the upper end of which engages the rear end face of the reduced section of the clutch actuating plunger 406. The lower end of the lever 449 engages the rear end of a pin 450 slidably mounted in a lug 451 on the bracket 384. The front end of the pin 450 is rounded and projects into the path of the cam 448 when the feed is connected to either spindle.

The gear 447 will make less than one complete revolution in feeding the auxiliary spindle 12 from one extreme position to the other. Hence, a second cam means is provided for coaction with the pin 450 to stop the feed of the auxiliary spindle 12 in its extreme protracted position. This cam means comprises a pin 452 slidably mounted in the gear 447 and formed with a head 453 adapted to be projected into position for engagement with the pin 450 shortly before the spindle 12 reaches its extreme protracted position. A coil spring 454 normally urges the pin 452 forwardly to hold the head out of line with the end of the pin 450. A beveled cam 455 is mounted on the shifter rod 441 for movement into the path of the front end of the pin 452 when the rod is actuated to connect the feed to the auxiliary spindle 12, and serves to force the head 453 into operative position to stop the feed when the spindle 12 reaches its extreme protracted position. Obviously, the head 453 remains in inoperative position at all times when the feed is connected to the main spindle 11.

It will be obvious that the cam 448 is operable to stop the feed of either spindle in moving into extreme retracted position.

In operation, with either spindle in either of its extreme positions, the cam 448 or the head 453 as the case may be, will engage the pin 450 to hold the clutch 370—393 positively in open position. Before the handle 412 can be pivoted to close the clutch for the purpose of instituting the feed for either spindle toward the remote position, it is necessary first to swing the handle about the shaft 383 in the direction in advance of the feed sufficiently to rotate the effective stop on the gear 447 out of engagement with the pin. Thereupon, the feed can be initiated.

Interlock means is provided to prevent institution of the feed unless the drive at the sleeve 424 is connected to one of the spindles, and to prevent connection of the feed to either spindle unless the other spindle is in full retracted position. This means comprises a lock pin 456 slidably mounted in a boss 457 on the bearing lug 442, and a spring 458 constantly urging the pin 456 rearwardly into bearing engagement with the front face of the gear 447. An arcuate cam recess 459 is formed in the front face of the gear 447, and is adapted to receive the rear rounded end of the lock pin 456 when the main spindle is in either of its extreme positions of feed, i. e. when the cam 448 engages the pin 450 to hold the control clutch in open position. The shifter rod 441 is formed with two spaced recesses 460 and 461 adapted to be positioned respectively in line with the front end of the lock pin 456 when the feed is connected to the spindle 11 or 12. Upon feeding either spindle out of its retracted position, rotation of the gear 447 will cause the cam recess 459 to press the pin 456 into one of the recesses 460 and 461, thus locking the rod 441 against actuation to change the feed from one spindle to the other. It will also be evident that unless one of the recesses 460 and 461 is in line with the pin 456, the latter will abut against the periphery of the rod 441, and hence will lock the gear 447 against rotation, thereby preventing the handle 412 from being swung preparatory to closing the control clutch.

Journalled in a horizontal tubular enlargement 462 (see Figs. 20 and 31) formed on the front of the cover 120 is a hand feed shaft 463. The inner end of the shaft 463 has a sliding rotary coupling connection 464 with the adjacent end of the worm shaft 362. Splined in abutting engagement on the outer end of the shaft 463 for rotation therewith are an inner sleeve 465 and a hand wheel 466. A nut 467 on the outer end of the shaft 463 is adapted to secure the sleeve 465 and the wheel 466 in assembled relation. Freely rotatable on the sleeve 465 is a micrometer dial 468 adapted to be clamped in relation to a zero point on the end of the bearing. The outer end of the shaft 463 is formed with an axial bore 469 and also with a transverse bore 470 opening therefrom to the interior of the dial 468. Slidably adjustable in the bore 469 is a pin 471, the inner end of which is formed with a lateral notch defining an inclined cam surface 472 opposite the bore 470. A pin 473 is slidably disposed in the bore 470, and has an inclined surface 474 on its inner end complemental to and coacting with the surface 472. The outer end of the pin 473 projects into engagement with the interior of the dial, and is adapted upon outward actuation to clamp the dial in any desired adjusted position.

A coil spring 475 in the inner end of the bore 469 tends to urge the pin 471 outwardly to release the dial 468. A clamp screw 476 is threaded into the outer end of the bore 469 for adjustment against the adjacent end of the pin 471 to clamp the dial in position. The latter thus is available at any time to indicate a predetermined feeding movement, and may be said to constitute a depth gauge.

Means is provided operable at will to clamp the main spindle 11 securely in position against axial feed, and in the present instance comprises a vertical shaft 477 (see Fig. 17) journalled in the rear side of the taper sleeve 143 preferably in the same transverse plane as the shaft 430. A forwardly extending operating handle 478 is secured to the upper end of the shaft 477. A pair of arcuate clamp shoes 479 have respectively a right hand and a left hand threaded connection with the shaft 477, and are positioned to engage the outer periphery of the main spindle ram 141.

Mounted in the bottom of the casing 119 and adapted to take oil from a well 480, with a bottom cover 481, is a suitable oil pump 482 (see Fig. 19) preferably of the displacement type. The pump 482 has a plunger 483 operatively connected to an eccentric 484 rotatable with the shaft 156, and has a discharge line 485 opening to the bottom of an oil chamber 486 formed in the top wall of the casing 119. Horizontal oil spray pipes 487 open from opposite sides of the chamber 486, and serve to discharge oil over the gears in the casing 119. A line (not shown) may also be provided to conduct oil from the chamber 486 to the gearing in the ram sleeve 143. Formed in the chamber 486 is a suitable overflow dam 489 which is connected through an overflow line 490 to a small chamber 491 formed in the front wall of the casing 119. A sight glass 492 is secured across the front of the chamber 491. Upper and lower discharge ports 493 and 494 are formed in the rear wall of the chamber 491 and open to the interior of the casing 119. The chamber 491 is located at the normal level of the oil in the casing 119 so that the glass 492 indicates the level and also whether or not there is an overflow from the chamber 486.

Tailstock

The tailstock column 13 has parallel recessed guideways 495 (see Fig. 32) in its underside seating on the rectangular bed ways 3. Outer gib plates 496 are secured to the under side of the column 13 and engage the under side of the ways 3 along their outer margins to secure the column slidably on the bed 1.

To provide means for adjusting the column 13 along the bed 1, a longitudinal gear rack 497 is secured to the inside of the front way 3 just under the overlying guideway 495, and is coextensive in length with the permissible travel of the column. The rack 497 meshes with a pinion 498 on the lower end of a vertical stub shaft 499 journalled in the base of the column 13. A bevel gear 500 on the upper end of the shaft 499 meshes with a bevel gear 501 on a horizontal shaft 502 journalled in the front of the column 13 and projecting therefrom for the reception of a handle (not shown).

To provide means for clamping the column 13 securely in position of adjustment, the front guideway flange is formed on its under side midway of its ends with a recess 503. A bolt 504 is anchored in the column 13 and extends downwardly centrally through the recess 503 and the gib plate 496. A flange nut 505 is threaded onto the lower end of the bolt 504 and is adjustable into engagement with the bottom of the gib plate 496 to flex the latter into the recess 503. A handle 506 is adjustably secured to the nut 505.

The column 13 is formed with a vertical space 507 extending substantially from the base to the top. The adjacent inner faces of the side standards are formed with the parallel vertical ways 14 on which the end support or tailstock 15 is mounted for vertical feed. In the present instance, the ways are formed along the right side with vertical V-shaped guides 508 and along the left side with flat bearing guides 509 (see Fig. 33). The end support 15 comprises a block 510 formed with V-shaped guideways 511 riding on the ways 508. A left end plate 512 is removably bolted to the block 510 and bears against the ways 509 to confine the end support slidably in the column.

Mounted in the bottom of the block 510 toward the rear is a fixed vertical feed nut 513 which is in threaded engagement with a vertical feed screw shaft 514. The latter is rotatably and adjustably suspended from the upper end of the column 13, and to this end, a mounting sleeve 515 is keyed for axial adjustment in a bore 516 in the top of the column. Adjusting nuts 517 are threaded onto opposite ends of the sleeve 515 into clamping engagement with the column 13. The upper end of the screw shaft 514 extends rotatably through the sleeve 515, and is supported by an end thrust ball-bearing 518 resting on the upper end of the sleeve and secured to the shaft by means of lock nuts 519. A peripheral collar 520 on the shaft 514 also engages the lower end of the sleeve 515.

The lower end of the shaft 514 is slidably splined in a sleeve 521 rotatable in the base of the column 13. Of the sleeve 521, the upper end has a peripheral flange 522 resting on the column base, and the lower end projects into a depending housing 523 and has secured thereto a bevel gear 524.

The gear 524 meshes with a bevel gear 525 having a sleeve 526 rotatable in a bearing 527 formed integral with a cover bracket 528 closing the right end and bottom of the housing 523. The bracket 528 is removably bolted to the housing 523, and is adapted to be removed to permit removal of the column 13 from the bed 1. Extending through and splined to the sleeve 526 is a horizontal drive shaft 529, the left end of which is rotatably anchored in the end bracket 36 and the right end of which extends through the bed 1 for connection with the power drive.

To remove the column 13 from the bed, the bracket 528 is removed. The column is moved off the end of the bed 1, or the gib plates 496 are removed and the column is lifted from the bed. An eye 530 is formed on the top to facilitate removal.

Means is provided for clamping the end support 15 removably in position of adjustment along the column. This means comprises a pair of clamp levers 531 pivotally mounted on two vertical rods 532 mounted in opposite sides of the block 510. The levers 531 are formed respectively with clamps 533 movable into engagement with the inner faces of the guides 508. The inner ends of the levers 531 extend between two collars 534 and 535 freely disposed on a clamp rod 536 slidably mounted in the block 510 and the plate 512. The collar 534 has a ball recess 537 in one end engaging a ball surface 538 on a peripheral enlargement on the rod 536. A coil spring 539 on the rod 536 is disposed between the plate 512 and the collar 535 and urges the latter yieldably against the levers 531 to hold the latter against the collar 534. Threaded onto the left end of the rod 536 is flanged nut 540 to which a handle 541 is adjustably secured. By adjusting the nut 540 on the rod 536, the latter can be drawn to the left to force the clamps 533 into engagement with the guideways 508. This acts also to clamp the plate 512 against the guides 509, thus providing a double clamping action.

*Milling feeds and transmission*

The machine bed 1 is formed along the front and the right end of the base of the column 8 with an integral case 542 for housing the power transmission and milling feeds for the headstock 10, the end block 15, the work saddle 5, the work table 7.

The right end section of the case 542 has a removable top cover plate 543 which is formed with depending bearing walls for supporting the parts in this section, and which together with these parts is adapted to be mounted in this section as a removable unit. Journalled in the plate 543 and in a removable bearing 544 in the rear end wall of the case 542 is a power inlet shaft 545 (see Fig. 40). The rear end of the shaft 545 projects out of the case 542 and has secured thereto a drive sheave 546 adapted to be connected through suitable belt means 547 to a motor 548 mounted on the right end of the case 542. Secured on the forward end of the shaft 545 is a gear 549 and also one element 550 of a reversible main control friction clutch 551. Journalled in the plate 543 in front of and in axial alinement with the shaft 545 is a shaft 552. A sleeve 553 is freely rotatable thereon and has secured thereto a gear 554 and also the other element 555 of the friction clutch 551. Splined on the shaft 552 between the clutch elements 550 and 555 for movement into selective engagement therewith or into neutral therebetween is a clutch actuating sleeve 556.

A shaft 557 parallel to the shaft 552 is journalled in the cover plate 543, and has a gear 558 on its front end in mesh with the gear 554, and a gear 559 on its rear end connected through an idler gear 560 to the gear 549. It will be evident that when the sleeve 556 actuates the rear clutch element 550, the shaft 552 will be driven in one direction directly from the shaft 545, that when the sleeve actuates the front clutch element 555, the shaft 552 will be driven in the other direction but at the same speed from the shaft 545 through the shaft 557, and that when the sleeve 556 is in central position, the power to the shaft 552 will be disconnected.

The means for actuating the clutch sleeve 556 (see Figs. 36, 37 and 40) comprises a shifter shoe 561 in engagement therewith, and secured to a shifter rod 562 slidable in the cover plate 543. A lever 563 pivoted intermediate its ends on the under side of the cover plate 543 is connected at one end to the rod 562 and at its other end engages in a notch 565 formed in a parallel slidable rod 566 also slidable in the cover 543. The parts thus far described are assembled on the under side of the cover 543, and are mounted as a removable unit in the case 542.

Mounted in the front portion of the case 542 is a gear box comprising a right end section 567 and a left end section 568 which are rigidly connected and formed with a network of bearing and mounting walls or webs. The gear box is removably supported in the case 542 by means of a plurality of spaced pads 569 seated on the side walls. Slidably mounted in the box section 567 is a shifter rod 570 (see Fig. 37) in end alinement with the rod 566 and removably secured thereto by means of a coupling 571. The rod 570 is formed in its underside with a transverse notch 572 which embraces the upper end of a lever 573 pivoted intermediate its ends in the section 567. The lower end of the lever 573 is connected through a twist link 574 to one arm of a horizontal bellcrank lever 575. The other arm of the lever 575 is pivotally connected to a rod 576 extending along the front of the gear box to the left side of the case 542 and there connected to the free end of a crank arm 577 on a shaft 578 journalled in the front wall of the case. A handle 579 is secured to the front end of the shaft 578 whereby the clutch sleeve 556 may be adjusted.

Secured to the front end of the shaft 552 is a bevel gear 580 which meshes with a bevel gear 581 secured to the lower end of the headstock spindle drive shaft 151, the lower end of which is journalled in the end section 567. It will be evident that the vertical shaft 151 is adapted to be driven at a constant speed in either direction.

The shaft 557 is driven continuously in one direction, and at its front end is provided with a friction clutch element 582. Journalled in axial alinement with the shaft 557 is a shaft 583 (see Fig. 42) which serves to transmit power to the milling feeds to be hereinafter described. A clutch sleeve 584 for actuating the clutch element 582 to connect or disconnect the shaft 557 to the shaft 583 is slidably splined on the latter.

Suitable means (see Figs. 37 and 42) is provided for automatically disengaging the clutch element 582 when the clutch sleeve 556 for the spindle drive is moved into neutral position so as to avoid driving the milling feeds when the drive shaft 151 for the headstock is idle, and for automatically closing the clutch element 582 when the sleeve 556 is moved into either end position. To this end, the coupling 571 is connected through a vertical link 586 with a crank arm 587 on a clutch yoke 588 engaging the clutch sleeve 584.

The shaft 583 is driven at a constant speed in one direction when the clutch 582 is closed, and has secured thereon a bevel gear 589 which meshes with a bevel gear 590 keyed to a stub shaft 591. The latter is connected through meshing gears 592 and 593 to a shaft 594 journalled in the end section 567 and extending parallel to the front of the machine. The shaft 594 thus is driven directly from the shaft 583 at a constant high speed, and hence is designated as the rapid traverse power shaft.

Secured to the front end of the shaft 583 is a pick-off gear 595 which meshes with a pick-off gear 596 on an overhead shaft 597. A bevel gear 598 is keyed to the shaft 597 and meshes with a bevel gear 599 secured to the power inlet shaft 600 of a feed-change mechanism. This mechanism in the present instance is a nine-feed mechanism, and is mounted in the case end section 567. It comprises the shaft 600, an intermediate shaft 601 and an outlet shaft 602, all parallel and journalled in the end section 567 (see Figs. 45 and 47).

Secured to the intermediate shaft 601 are two spaced fixed gear elements 603 and 604 comprising respectively gears 605 and 606 and gears 607 and 608. A pair of gear elements 609 and 610 are slidably splined to the inlet shaft 600. The gear element 609 comprises cluster gears 611 and 612 movable in opposite directions into selective engagement with the intermediate gears 605 and 607. The gear element 610 has a gear 613 movable into and out of mesh with the intermediate gear 608. Slidably splined on the outlet shaft 602 are two gear elements 614 and 615 comprising respectively gears 616 and 617 movable in opposite directions into selective engagement with the intermediate gears 606 and 607, and a gear 618 movable into and out of mesh with an intermediate gear 619. Thus, through selective adjustment of the four gear elements 609, 610, 614 and 615 nine different speeds for the shaft 602 are available.

A unitary control device is provided for shifting the elements 609, 610, 614, and 615 selectively, and for interlocking said elements in such a manner that only one gear on each of the inlet and outlet shafts can be brought into mesh with the companion gears on the intermediate shaft 601 at any one time.

This device (see Figs. 45 and 46) comprises two parallel shafts 620 and 621 journalled in the end section 567. Secured to the shaft 620 is a cam member comprising two axially spaced drums 622 and 623 formed respectively with cam grooves 624 and 625. A pair of shifter shoes 626 and 627 respectively engage the gear elements 609 and 610 on the inlet shaft 600, are slidably mounted on a fixed guide rod 628, and are provided with lateral pins 629 and 630 projecting into the cam grooves 624 and 625. A cam member also comprising two axially spaced drums 631 and 632 formed respectively with peripheral cam grooves 633 and 634 is similarly secured to the shaft 621. A shifter shoe 635 and a shifter finger 636 respectively are secured to the gear elements 614 and 615 on the outlet shaft 602, are slidably mounted on a rod 638 slidable in the end casing 567, and have transverse pins 639 and 640 engaging in the grooves 633 and 634.

The drum 632 is provided on one end with a gear 641. The drum 623 is provided on one end with a mutilated gear 642 adapted to mesh with the gear 641 for one-third of a revolution, and also with a bevel gear 643 meshing with a bevel gear 644 on an operating shaft 645 journalled in a removable cover 646 on the top of the case 542. An adjusting handle 647 is secured to the upper end of the shaft 645.

Both sets of cam grooves are so shaped that upon each rotation starting from the initial speed position, they will shift the gear elements successively into second and third speed positions during the first two-thirds of the revolution, and then back into the initial speed position during the last third of the revolution. The gears 641 and 642 are so related that the drums 631 and 632 will be rotated through one-third of a revolution during the last third of each revolution of the drums 622 and 623, but will be stationary at all other times. Thus, the actuating handle 647 has nine successive speed positions. To lock the drum 631 and 632 in position during each idle period, the gear 641 is formed with three peripherally spaced arcuate lands 648, one of which is movable into interfitting relation with the mutilated gear 642 at the end of each adjustment.

Secured to the end of the outlet shaft 602 of the nine-speed mechanism is a gear 649 which meshes continuously with a back gear 650 fixed on a shaft 651. A second back gear 652 is secured to the shaft 651 and meshes with a gear 653 rotatable on a shaft 654 journalled in axial alinement with the shaft 602. A shift gear element 655 is splined to the shaft 654, and has opposite end gears 656 and 657 movable respectively and selectively into and out of engagement with the gears 649 and 653, thus connecting the shaft 654 either directly to the shaft 602 for rotation at one speed, or indirectly through the back gears for rotation at another speed. The two speeds thus available multiply the nine speeds to provide a total of eighteen speeds.

To shift the gear element 655, a shifter shoe 658 (see Fig. 46) is provided in engagement therewith, and is secured to the reciprocatory shifter rod 638. The latter is formed with a transverse notch 659 which embraces the rear end of a lever 660 secured to a rock shaft 661 pivoted in the cover 646. A handle 662 is secured to the upper end of the shaft 661 for adjusting the two-speed change element 655.

The cover 646 is indented to form a recess 663, and the latter is closed at the top by a plate 664. Pivotally mounted on a stud 665 on the bottom wall of the recess 663 is a gear 666 in mesh with a gear 667 on the shaft 645 and bearing a speed ratio of 1 to 3 thereto. A circular dial 668 is secured to the top face of the gear 666 for rotation therewith, and has two concentric scales thereon. An opening 671 in the plate 664 serves to expose the successive laterally alined readings of the scales at one side. Slidably disposed across the opening 671 and over the scales is a slide bar 672 which is pivotally connected to the handle 662 and which has an opening 673 movable from one scale to the other to indicate the feed provided for each adjustment of the handles 647 and 662.

Secured to the shaft 654 is a pinion 674 which meshes with a gear 675 rotatable on a transmission shaft 676 in the left section 567 of the gear box, and in axial alinement with the rapid traverse power shaft 594. A friction clutch element 677 is rigid with the adjacent end of the shaft 594, and an opposed end gear clutch element 678 is formed on the adjacent face of the gear 675. Slidably splined on the shaft 676 for selective coaction with the clutch elements 677 and 678 upon movement in opposite directions is a clutch sleeve 679. A shifter shoe 680 (see Fig. 44) engages the sleeve 679, and has two trunnions 681 engaging in the notched arms of a yoke 682 secured to a rock shaft 683. A crank arm 684 secured to the front end of the shaft 683 carries a pin 685 which engages in a notch 686 in the free end of a second crank arm 687 secured to a rock shaft 688 pivoted in the front wall of the case 542. An adjusting handle 689 is secured to the front end of the shaft 688, and is manipulable to connect the transmission shaft 676 either to the rapid traverse or the adjustable feed.

The free end of the transmission shaft 676 is connected through a separable spline coupling 690 directly to the axially alined shaft 97 journalled in the end wall of the case 542 and extending through the bed 1 for connection with the cross-feed drive for the table 7.

Rigidly secured to the transmission shaft 676 are three spaced gears 691, 692 and 693. Freely rotatable on a parallel stub shaft 694 and formed with opposed clutch elements 695 and 696 on their adjacent faces are two gears 697 and 698 of which the gear 697 meshes directly with the gear 691, and the gear 698 is connected through an idler gear 699 with the gear 693. One end of the stub shaft 694 has a bevel gear 700 which meshes with a bevel gear 701 on the lower end of the vertical feed screw shaft 139 for the headstock 10. The other end of the stub shaft 694 is connected through a separable spline coupling 702 to the axially alined shaft 529 journalled in the left end wall of the case 542 and extending through the bed 1 for connection to the vertical feed screw shaft 514 of the end support 15.

Slidably splined to the shaft 694 is a clutch sleeve 703 having opposed end clutch elements 704 and 705 for selective engagement with the elements 695 and 696 to drive the headstock and the end support synchronously in either vertical direction.

A shifter shoe 706 engages the clutch sleeve 703 and is secured to a slidable shifter rod 707. The rod is formed with a transverse notch 708 (see Fig. 44) in its upper surface which embraces the free end of a crank arm 709 secured to a rock shaft 710 extending to the front of the case 542. Secured to the front end of the rock shaft 710 is a substantially horizontal crank arm 711 secured at its free end to an upwardly extending link 712. The link 712 is arched forwardly, and is formed in its upper end with a bearing recess 713 receiving the ball end of an adjusting handle 714. The latter has a universal ball mounting in the base 715 of a control unit removably secured on the top wall of a cover plate 543ª. A gland 716 confines the lever in position, and has a vertical slot 717 constraining the handle 714 for vertical movement. Upon moving the lever upwardly, the clutch sleeve 703 will be actuated to drive the headstock and the end support upwardly, and vice versa.

To provide means for feeding the headstock and the end support manually, the bevel gear 701 meshes with a bevel gear 718 secured on a shaft 719 extending to the front of the case 542 (see Figs. 40 and 41). The front end of the shaft 719 extends rotatably through a sleeve 720 journalled in a bearing bracket 721, and has secured thereto a gear 722 which is connected through an idler gear 723 to a gear 724 secured to an operating shaft 725 journalled in the base 715 of the control unit. Secured to the front end of the shaft 725 is an end clutch 726 with which a spring-pressed handle 727 is adapted to engage upon pressure to provide the manual drive. A micrometer dial 728 is rotatably mounted on the shaft 725 inside of the clutch 726, and is adapted to be secured in any selected initial position by means of a clamp 729 similar to that employed in the hand feed for the headstock spindles.

Means is provided for automatically throwing the clutch sleeve 703 into neutral position upon movement of the headstock 10 into either of its extreme positions of travel. This means (see Figs. 48, 49 and 50) comprises a notched lug 730 on the under side of the shifter shoe 706 and embracing the free end of an arm 731 secured to the forward end of a rock shaft 732 journalled in a fixed bearing. An arm 733 is secured to the rear end of the shaft 732, and is formed with a forwardly extending cam pin 734 which projects between two parallel vertical plungers 735 and 736 slidably mounted in lower tubular bearings 737 and splined in upper tubular bearings 738. A coil spring 739 engages the lower end of the plunger 735, and normally urges the latter into the uppermost position permitted by the spline. The upper end of the plunger 735 is positioned for engagement by the lower wall of the headstock 10 when the latter is moved into its lowermost position. The plunger 736 normally occupies its lowermost position, and extends upwardly along the column 8. A stop 740 is secured to the upper end of the plunger 736 and projects into the path of the headstock 10.

The plungers 735 and 736 are formed in their adjacent sides with opposed cam notches 742 and 743 which in the normal position of the plungers are positioned at opposite sides of the pin 734 to permit actuation of the clutch sleeve 703. Movement of either plunger out of normal position serves to move the clutch sleeve if it has previously been actuated toward the plunger.

Secured to a stub shaft 744 are two spaced gears 745 and 746 (see Fig. 40) of which the gear 746 meshes directly with the gear 693 on the transmission shaft 676 and the gear 745 is connected through an idler gear 747 to the gear 692. The shaft 744 is connected through a separable spline coupling 748 to the axially alined screw 34 which is journalled in the end wall of the case 543 and which extends through the bed 1 for connection to the traverse drive for the saddle 5. The adjacent faces of the gears 745 and 746 are formed with end clutch elements. Slidably splined to the shaft 744 is a clutch sleeve 751 having end clutch elements movable selectively in opposite directions into respective engagement with the elements on the gears 745 and 746 to establish a drive in either direction for the saddle 5. A shifter shoe 754 engages the clutch sleeve 751 and is secured on a slidable shifter rod 755. The shoe 754 is formed with a slotted lug 756 which embraces one end of a lever 757, the other end of which is bent upwardly and notched to engage the ball end of a shifting handle 758. The lever 758 has a universal ball mounted in the base 715 of the front control unit and is held in assembled relation by a gland 759. The latter has a horizontal slot 760 confining the handle 758 for movement in a horizontal plane. Thus, upon shifting the handle 758 to the left, the saddle will be driven to the left and vice versa.

To provide means for manually adjusting the saddle 5, a bevel gear 761 is secured on the shaft 744 and meshes with a bevel gear 762 on the sleeve 720 (see Fig. 41). The latter is provided with a gear 763 which meshes through an idler gear 764 with a gear 765 secured to an operating shaft 766 journalled in the front of the control unit. A clutch element 767 is secured to the front end of the shaft 766 for engagement by an operating handle normally loose on the shaft and spring pressed out of clutching engagement. A micrometer dial 770 is rotatable on the shaft 766 against the front of the unit, and is adapted to be secured in selected position by a clamp 771 similar to the one employed for the dial 728.

It will be noted that the base 715 with the handles 714, 727, 758, and 769 and the shafts 725 and 766 constitute a control unit adapted to be mounted bodily in place, and that when assembled with the other parts will interfit in operative relation therewith.

Means is provided for automatically throwing the clutch sleeve 751 into neutral position upon movement of the saddle into either extreme position along the bed 1. This means comprises a pair of spaced cam lugs 773 and 774 (see Fig. 1) adjustably secured to the under side of the saddle 5 along the front of the bed 1. A shifter rod 775 is slidably mounted in bearing lugs 776 secured to the front of the bed 1, and has secured thereon two spaced stops 777 and 778. A pair of bell-crank levers 779 and 780 are pivotally mounted on the front of the bed 1, and are positioned with two depending legs in engagement with the remote ends of the stops 777 and 778. The other legs of the levers 779 and 780 extend in opposite directions into the paths of the respective cam lugs 773 and 774. The shifter rod 775 is pivotally connected at one end to the free end of a crank arm 781 (see Fig. 39) secured to the outer end of a rock shaft 782 journalled in the front wall of the casing 542. The shaft 782 has a crank arm 783 on its rear end which carries a pin 784 disposed in the lower notched end of a lever 786. The upper end of the lever 786 engages in a notch 788 in the shifter rod 755. Thus actuation of the rod 775 by the saddle 5 in either direction will shift the clutch sleeve 751 into neutral position.

*Brief résumé of the operation*

The operation will be apparent from the foregoing description, and briefly is as follows:

The saddle 5 may be driven along the bed 1 to the right or left upon actuation of the lever 758 to the right or left. The work table 7 may be driven forwardly or rearwardly upon actuation of the lever 89 forwardly or rearwardly. The headstock 10 may be driven upwardly or downwardly upon actuation of the clutch lever 714 upwardly or downwardly. If the end support is mounted on the base, the block 15 will be driven synchronously with the headstock. These drives may be instituted independently of each other, and are also independent in direction. As a result, the machine has a wider range of usefulness and adaptability than is possible in prior machines of the type known as horizontal boring, drilling and milling machines. Each unit is under the control of automatic stops for limiting the range of movement.

Each of the foregoing units may be driven at a high speed or at selective slow speeds upon proper manipulation of the lever 689. Any one of eighteen slow speeds may be provided upon proper manipulation of the levers 647 and 662, and the rate of feed will be indicated on the dial 668 (see Fig. 45).

The saddle 5, the table 7 and the headstock 10 also may be fed manually from the shafts 766, 103 or 104 and 725, and may be clamped selectively in position of adjustment upon actuation of the levers 30, 61 and 137.

The power inlet shaft 583 for these transmissions is adapted to be connected to the source of power upon actuation of the lever 579 in either direction to connect the inlet shaft 151 for the headstock 10 to the source.

The shaft 151 is adapted to be driven in either direction at a constant speed, and is adapted to be connected through a nine-speed change mechanism under the control of the lever 212, a two-speed change mechanism and a second two-speed change mechanism under the dual control of the lever 255, connected in series and constituting thirty-six speed changes, to the auxiliary spindle 12. The main spindle 11 is driven from the auxiliary spindle 12 at a reduced speed when the auxiliary spindle is not connected to the axial feed.

One or the other of the spindles 11 and 12 is adapted to be fed axially. The drive for feeding the spindles is taken from the auxiliary spindle and includes in series a nine-speed change mechanism under the control of the handle 321, a two-speed change mechanism under the control of the lever 336, a reversing mechanism under the control of the lever 359, a master clutch under the control of the lever 412, and the connections to the feed rams under the control of the lever 440. Thus, each spindle may be fed in either direction at any one of eighteen feeds for each speed of rotation. The rate of feed for each spindle is indicated on the dial 342. The spindles are interlocked against simultaneous feed out of retracted position, and suitable stops are operable to open the master clutch automatically at each extreme limit of travel and also at the end of any desired feed. The wheel 466 may be turned to feed the spindles manually, and the main spindle 12 may be clamped in position of feed by means of the lever 478.

I claim as my invention:—

1. A horizontal boring machine comprising, in combination, a horizontal bed, a saddle reciprocable along said bed, a work support reciprocable on said saddle transversely of said bed, a column on one end of said bed, a headstock vertically reciprocable on said column, said headstock having two parallel spindles and self-contained variable speed means for driving said spindles and feeding them axially, a column on the other end of said bed, an end support vertically reciprocable on said last mentioned column, and means for driving said saddle, said table, and said headstock and end support, each independently, said means including a reversing clutch and an actuating element therefor for each unit, each element upon movement from neutral in either direction being effective to institute movement of the corresponding unit in the same direction.

2. A horizontal boring machine comprising, in combination, a horizontal bed, a saddle reciprocable along said bed, a work support reciprocable on said saddle transversely of said bed, a column on one end of said bed, a headstock vertically reciprocable on said column, said headstock having two parallel spindles for self-contained variable speed means for driving said spindles and feeding them axially, and means for driving said saddle, said table, and said headstock, each selectively and independently in direction, said means including a reversing clutch and an actuating element therefor for each unit, each element upon movement from neutral in either direction being effective to institute movement of the corresponding unit in the same direction.

3. A horizontal boring machine comprising, in combination, a horizontal bed, a saddle reciprocable along said bed, a work support reciprocable on said saddle transversely of said bed, a column on one end of said bed, a headstock vertically reciprocable on said column, and means for driving said saddle, said table, and said headstock, selectively and independently in direction, said means including a reversing clutch and an actuating element therefor for each unit, each element upon movement from neutral in either direction being effective to institute movement of the corresponding unit in the same direction.

4. A horizontal boring machine comprising, in combination, a horizontal bed, a saddle reciprocable along said bed, a work support reciprocable on said saddle transversely of said bed, a column on one end of said bed, a headstock vertically reciprocable on said column, and means for driving said saddle, said table, and said headstock selectively and independently in direction.

5. A horizontal boring machine comprising in combination, a horizontal bed, a column on said bed, a headstock vertically reciprocable on said column, said headstock having a spindle and self-contained adjustable-speed means for rotating said spindle and feeding same axially, a vertical feed screw for said headstock, a power inlet shaft for said headstock, power means including a one-way clutch for driving said screw, power means including a reversing clutch for driving said shaft at a constant speed, means for actuating said last mentioned clutch, and means operable by said last mentioned means upon movement of said reversing clutch into neutral position to open said one-way clutch.

6. A boring machine comprising, in combination, a horizontal bed, a column on said bed, a headstock vertically reciprocable on said column, said headstock having a spindle, a vertical feed screw for said headstock, a power inlet shaft for said headstock, power means including a one-way clutch for driving said screw, power means including a reversing clutch for driving said shaft, means for actuating said last mentioned clutch, and means operable by said last mentioned means upon movement of said reversing clutch into neutral position to open said one-way clutch.

7. A boring machine comprising, in combination, a support, a machine unit movable on said support, said unit having an operable element, a feed screw for said unit, a power inlet shaft for said unit, power means including a clutch for driving said screw, power means including a reversing clutch for driving said shaft, means for actuating said last mentioned clutch, and means operable by said last mentioned means upon movement of said reversing clutch from either operative position into neutral position to open said first mentioned clutch.

8. A horizontal boring machine comprising, in combination, a horizontal bed, a column on said bed, a headstock vertically reciprocable on said column, said headstock having a spindle and self-contained adjustable-speed means for rotating said spindle and feeding same axially, a vertical feed screw for said headstock, a power inlet shaft for said headstock, a power drive, means including a reversing clutch for connecting said drive to said inlet shaft, means for connecting said drive to said screw, said last mentioned means including in series, a one-way clutch, a high speed transmission and a variable low speed transmission in parallel, and a reversing clutch, and an operating element for said last mentioned reversing clutch movable upwardly to institute upward movement of said headstock and downwardly to institute downward movement of said headstock.

9. A horizontal boring machine comprising, a combination, a horizontal bed, a column on said bed, a headstock vertically reciprocable on said column, said headstock having a spindle, a vertical feed screw for said headstock, a power inlet shaft for said headstock, a power drive, means including a reversing clutch for connecting said drive to said inlet shaft, means for connecting said drive to said screw, said last mentioned means including in series, a one-way clutch, a high speed transmission and a variable low speed transmission in parallel, and a reversing clutch, an operating element therefore movable upwardly to institute upward movement of said headstock and downwardly to institute downward movement of said headstock, and means operable upon movement of said first mentioned reversing clutch into neutral position to automatically open said one-way clutch.

10. A horizontal boring machine comprising, in combination, a horizontal bed, a column on said bed, a headstock vertically reciprocable on said column, said headstock having a spindle and self-contained adjustable-speed means for rotating said spindle and feeding same axially, a vertical feed screw for said headstock, a power inlet shaft for said headstock, a power drive, means for connecting said drive to said inlet shaft, means including a reversing clutch for connecting said drive to said screw, and an operating element for said reversing clutch movable vertically in either direction to institute movement of said headstock in the same direction.

11. A horizontal boring machine comprising, in combination, a horizontal bed, a column on one end of said bed, a headstock vertically reciprocable on said column, a vertical feed screw for said headstock, a column on the other end of said bed, an end block vertically reciprocable on said last mentioned column, a feed screw for said end block, reversing gearing, power inlet means including a high speed transmission and a variable low speed transmission for said gearing, means connecting said gearing to said first mentioned screw, a shaft extending through said bed and connecting said gearing to said last mentioned screw, and an actuating element for said gearing movable vertically in either direction to institute synchronous movement of said headstock and said end block in the same direction.

12. A horizontal boring machine comprising, in combination, a horizontal bed, a saddle movable on said bed, a support movable on said saddle, a column on said bed, a headstock vertically reciprocable on said column, a power drive for said units including a high speed transmission and a variable low speed transmission in parallel, an outlet transmission shaft, and clutch means for connecting said transmissions selectively to said shaft, a reversing gear mechanism connected to said shaft, a feed screw for said saddle connected to said mechanism, an actuating element for said mechanism movable horizontally in either direction to institute movement of said saddle in the same direction, a second reversing gear mechanism connected to said shaft, a feed screw for said headstock connected to said mechanism, an actuating element for said second mechanism movable vertically in either direction to institute movement of said headstock in the same direction, said shaft extending through said bed to said support, a reversing gear mechanism carried by said saddle and connected to said shaft, a feed screw for said support connected to said last mentioned mechanism, and an actuating element for said last mentioned mechanism movable horizontally in either direction to institute movement of said support in the same direction.

13. A horizontal boring machine comprising, in combination, a horizontal bed, a saddle movable on said bed, a support movable on said saddle, a power drive including a high speed transmission, a variable low speed transmission, an outlet transmission shaft, and clutch means for connecting said transmissions selectively to said shaft, a reversing gear mechanism connected to said shaft, a feed screw for said saddle connected to said mechanism, an actuating element for said mechanism movable horizontally in either direction to institute movement of said saddle in the same direction, said shaft extending through said bed to said support, a reversing gear mechanism carried by said saddle and connected to said shaft, a feed screw for said support connected to said last mentioned mechanism, and an actuating element for said last mentioned mechanism movable horizontally in either direction to institute movement of said support in the same direction.

14. A horizontal boring machine comprising, in combination, a horizontal bed, a saddle movable on said bed, a support movable on said saddle, a power drive including a high speed transmission, a variable low speed transmission, an outlet transmission shaft, and clutch means for connecting said transmissions selectively to said shaft, a reversing gear mechanism connected to said shaft, a feed screw for said saddle connected to said mechanism and an actuating element for said mechanism movable horizontally in either direction to institute movement of said saddle in the same direction.

15. In a boring machine, in combination, a support having a way, a member mounted on said way for reciprocation on said support, a gib secured to said member and engaging the back of said way, said member being formed with a recess along the front of a portion of said gib, a clamping head engaging the back of said gib within the region of said recess and having a shank extending through said gib and said recess into said member, a block secured to the inner end of said shank and having a transverse bore, an eccentric rotatably mounted in said member and disposed in said bore, and means for rotating said eccentric to clamp said head against said gib.

16. In a boring machine, in combination, a horizontal support having a way, a member mounted on said way for reciprocation on said support, one end of said member extending beyond said support, a gib secured to said member and engaging the underside of said way, said member and said gib being formed to define a recess therebetween along a portion of said gib, a clamping element engaging the back of said gib within the region of said recess and extending through said gib and said recess into said member, a block on the inner end of said clamping element, cam means operatively mounted in said member and coacting with said block, and means for actuating said cam means to clamp said element against said gib, said last mentioned means including an operating lever underlying said member.

17. In a boring machine, in combination, a support having a way, a member mounted on said way for movement on said support, a gib secured to said member and engaging the back of said way, said member being formed with a recess along the front of a portion of said gib, a clamping head engaging the back of said gib within the region of said recess and having a shank extending through said gib and said recess into said member, a block on the inner end of said shank, cam means coacting with said block, and means for actuating said cam means to clamp said head against said gib.

18. In a boring machine, in combination, a horizontal support having parallel upper ways respectively at opposite sides, a member reciprocable on said ways, gibs secured to said member and respectively engaging the undersides of said ways, two clamps mounted in said member for clamping said gibs to said ways, each clamp having an apertured block on its inner end, a shaft rotatably mounted in said member and extending through said blocks, two eccentrics on said shaft one in coacting relation with each block, and means for rotating said shaft.

19. In a boring machine, in combination, a horizontal support having parallel upper ways respectively at opposite sides, a member reciprocable on said ways, and extending beyond said support, gibs secured to said member and respectively engaging the underside of said ways, two clamps mounted in said member for clamping said gibs to said ways, each clamp having a block on its inner end, cam means one in coacting relation with each block, and single means for actuating said cam means simultaneously, said last mentioned means including an operating element underlying said member.

20. In a boring machine, in combination, a support, a saddle mounted on said support for reciprocation in one direction, a table mounted on said saddle for reciprocation at right angles to said direction, means for clamping said saddle in position of adjustment on said support, means for clamping said table in position of adjustment on said saddle, two concentric shafts journaled in said support, actuating means connecting said two first mentioned means respectively to said shafts, and two operating handles, one secured to each shaft, said handles underlying said saddle.

21. In a boring machine, in combination, a support, a saddle movably mounted on said support, a table movably mounted on said saddle, means for clamping said saddle in position of adjustment on said support, means for clamping said table in position of adjustment on said saddle, two concentric shafts journalled in said support, actuating means connecting said two first mentioned means respectively to said shafts, and two operating members, one secured to each shaft.

22. In a boring machine, in combination, a horizontal support having a way along one side, a member reciprocable on said way, a gib secured to said member and engaging the underside of said way, said gib having a depending flange engaging the side of said support, a block mounted for vertical adjustment on said support, a lever pivotally mounted in said block and having a clamping toe engaging said flange, one end of said lever projecting into said support, an eccentric coacting with the free inner end of said lever, and means for rotating said eccentric.

23. In a boring machine, in combination, a support, a member movable on said support, a plate secured to said member and engaging said support, a block mounted for adjustment on said support, a lever pivotally mounted in said block and having a part for clamping said plate to said support, one end of said lever projecting into said support, a shaft journalled in said support, an eccentric on said shaft and coacting with the free inner end of said lever, and means for rotating said shaft.

24. In a boring machine, in combination, a support, a member movable on said support, a plate secured to said member and engaging said support, a block mounted for adjustment on said support, a lever pivotally mounted in said block and having a part for clamping said plate to said support, and cam means coacting with one end of said lever in any position of adjustment of said block for actuating said lever.

25. In a boring machine, in combination, an elongated supporting bed, a saddle mounted for reciprocation on said bed, a work support mounted on said saddle for reciprocation transversely of said saddle, a feed screw for said saddle, and a unitary table drive unit for said support, said unit comprising a housing mounted in said saddle and depending into said bed, a power inlet shaft rotatably anchored in said bed and extending through the lower end of said housing and gearing including a reversing clutch for connecting said shaft to said screw.

26. In a horizontal boring machine, in combination, an elongated supporting bed, a saddle mounted for reciprocation along said bed, a work support mounted on said saddle for reciprocation transversely of said bed, a stationary feed screw mounted in said support, and a table drive unit for said support, said unit comprising a housing mounted in said saddle, a power inlet shaft extending through said housing, and gearing including a reversing clutch for connecting said shaft to said screw.

27. In a horizontal boring machine, in combination, a supporting bed, a saddle mounted for reciprocation on said bed, a work support mounted for reciprocation on said saddle, a feed screw mounted in said support, and a drive unit for said support, said unit comprising a housing mounted in said saddle, a feed nut rotatable in said housing and operatively engaging said screw, a power inlet shaft anchored in said bed and extending through said housing, gearing including a reversing clutch in said housing for connecting said nut to said shaft, a shifter rod for said clutch, said rod having spaced abutments at opposite sides of said housing, stops on said support for engaging said abutments to automatically return said clutch to neutral at each extreme limit of travel, a shaft operatively connected to said gearing and extending to one end of said saddle, and two transverse shafts operatively connected to said last mentioned shaft and extending to opposite sides of said saddle at one side of said bed for manual manipulation.

28. In a horizontal boring machine, in combination, a supporting bed, a saddle mounted for reciprocation along said bed, a work support mounted for reciprocation on said saddle transversely of said bed, a feed screw mounted in said support, and a drive unit for said support, said unit comprising a housing mounted in said saddle, and depending into said bed, a feed nut rotatable in said housing and operatively engaging said screw, a power inlet shaft rotatably anchored in said bed and extending through the lower end of said housing, gearing including a reversing clutch in said housing for connecting said nut to said shaft, a shifter rod for said clutch, and an operating lever connected to said rod for actuation in either direction from neutral to institute movement of said support in the same direction.

29. In a boring machine, in combination, a supporting bed, a saddle mounted for reciprocation on said bed, a work support mounted for reciprocation on said saddle, a feed screw mounted in said support, and a drive unit for said support, said unit comprising a housing mounted in said saddle, a feed nut rotatable in said housing and operatively engaging said screw, a power inlet shaft extending through said housing, gearing including a reversing clutch in said housing for connecting said nut to said shaft, a shifter rod for said clutch, said rod having spaced abutments at opposite sides of said housing, an operating lever connected to said rod and projecting from one side of said saddle for actuation in either direction from neutral to institute movement of said support in the same direction, and spaced stops on said support for engaging said abutments to automatically return said clutch to neutral at each extreme limit of travel.

30. In a horizontal boring machine, in combination, a bed, a saddle movable on said bed, a support movable on said saddle, said saddle being formed with a central chamber, a housing removably mounted in said chamber, a feed screw for said support extending through the upper end of said housing, a feed nut rotatably journalled in said housing and operatively engaging said screw, a power inlet shaft extending through the lower end of said housing, a gear journalled in said housing and splined to said shaft, and reversing mechanism in said housing operatively connecting said nut to said gear.

31. In a boring machine, a headstock comprising, in combination, an auxiliary spindle, a main spindle, drive means for said auxiliary spindle, means including a clutch for driving said main spindle from said auxiliary spindle, means including a clutch for selectively feeding said spindles axially and means automatically operable upon actuation of said last mentioned clutch in a direction to connect said last mentioned means to said auxiliary spindle to open said first mentioned clutch.

32. In a boring machine, a headstock comprising, in combination, a spindle, a second spindle, drive means for said first spindle, means including a clutch for driving said second spindle from said first spindle, means including a clutch for selectively feeding said spindles axially, means automatically operable upon actuation of said last mentioned clutch in a direction to connect said last mentioned means to said first spindle to open said first mentioned clutch, and interlock means automatically operable to lock said last mentioned clutch in position upon feeding either spindle out of retracted position.

33. In a boring machine, a headstock comprising, in combination, two spindles mounted for rotation and for axial feed, drive means for said spindles, means for selectively feeding said spindles, and means operable upon connection of said last mentioned means to one of said spindles to automatically disconnect said drive means from the other of said spindles.

34. In a boring machine, a headstock comprising, in combination, two spindles mounted for rotation and for axial feed, each spindle having a retracted position, means for selectively feeding said spindles, and interlock means operable to prevent the institution of the feed for either spindle unless the other is in its retracted position.

35. In a boring machine, a headstock comprising, in combination, a main spindle, an auxiliary spindle, said spindles being mounted for rotation and for axial feed, adjustable speed means for driving said auxiliary spindle, means including a clutch for driving said main spindle from said auxiliary spindle, and means having a direct driving connection with said auxiliary spindle independently of said main spindle for feeding said spindles axially.

36. In a boring machine, a headstock comprising, in combination, a tool spindle, a second tool spindle, said spindles being mounted for rotation and for axial feed, adjustable speed means for driving one of said spindles, means including a clutch for driving the other of said spindles, means for feeding said one spindle axially, and means automatically operable to open and close said clutch respectively upon connecting and disconnecting said last mentioned means to said one spindle.

37. In a boring machine, a headstock comprising, in combination, a casing, a drive shaft extending into said casing, a nine-speed adjustable gearing connected to said shaft, a single actuator for said gearing, a two-speed adjustable gearing connected in series with said nine-speed gearing, a second two-speed adjustable gearing connected in series with said first mentioned gearings, a single actuator for said last two mentioned gearings, and a spindle connected to said last mentioned gearing.

38. In a boring machine, a headstock comprising, in combination, a rotatable sleeve, speed-change gear means for driving said sleeve, a spindle splined for longitudinal movement in said sleeve, a second rotatable sleeve, means including a clutch for driving said second sleeve from said first mentioned sleeve, and a spindle splined for longitudinal movement in said second sleeve.

39. In a boring machine, a headstock comprising, in combination, a casing having a removable front cover plate, a main spindle mounted for rotation and for axial feed in said casing, an auxiliary spindle mounted for rotation and for axial feed in said casing, adjustable speed means for driving said auxiliary spindle, means for driving said main spindle from said auxiliary spindle, and means deriving power from said auxiliary spindle for feeding said spindles selectively, said last mentioned means including adjustable speed and reversing gearing mounted on the inside of said cover plate.

40. In a boring machine, a headstock comprising, in combination, a casing having a removable front cover plate, a spindle mounted for rotation and for axial feed in said casing, a second spindle mounted for rotation and for axial feed in said casing, adjustable speed means for driving said one spindle, means for driving said second spindle from said one spindle, and means deriving power from one of said spindles for feeding said spindles selectively, said last mentioned means including adjustable speed and reversing gearing mounted on the inside of said cover plate.

41. In a boring machine, a headstock comprising, in combination, a casing, a pair of spindles mounted in said casing, adjustable speed means in said casing for rotating said spindles, adjustable speed means in said casing for feeding said spindles axially, a lubricant pump in said casing taking lubricant from the bottom of said casing, a reservoir at the top of said casing, said pump discharging to said reservoir, means for distributing lubricant from said reservoir to various parts in said casing, an overflow dam in said reservoir, a chamber having a sight glass near the bottom of said casing and opening at two levels to the bottom of said casing, and means for discharging lubricant from said dam to the top of said last mentioned chamber.

42. In a boring machine, in combination, a support having spaced parallel vertical ways, a machine unit comprising a casing movable on said ways, a pair of opposite horizontally alined levers pivotally mounted on said casing, the outer ends of said levers constituting clamps positioned for engagement with the rear of said ways, the inner ends of said levers extending toward each other, a vertical lever bearing at its upper end against said casing and having side flanges underlying the inner ends of said first mentioned levers, and adjustable means extending through said casing from the front and operatively connected to the lower end of said vertical lever for actuating the latter about its upper end.

43. In a boring machine, a headstock comprising, in combination, a pair of spindles mounted for rotation and axial reciprocation, means for rotating said spindles, means including a clutch for selectively feeding said spindles axially, a shifter rod for said clutch, spring-pressed detent means normally out of engagement with said shifter rod, and cam means operable in timed relation to the feed of either spindle for moving said detent means into engagement with said shifter rod to lock the latter in position upon movement of either spindle out of initial position.

44. In a boring machine, a headstock comprising, in combination, a relatively small auxiliary spindle mounted for rotation and for axial feed, a relatively large main spindle mounted for rotation and for axial feed, the range of feed of said main spindle being greater than that of said auxiliary spindle, a power drive including a master clutch, means including a clutch for connecting said drive selectively to said spindles to feed the latter, a shifter member for actuating said last mentioned clutch, and means operable in timed relation to the feed of either spindle, said means comprising a cam for opening said master clutch upon movement of said auxiliary spindle into its initial position and upon movement of said main spindle into either extreme position, and comprising a supplemental cam normally in inoperative position, and movable into operative position, and movable into operative position by said shifter member upon actuation of the latter to institute the feed for said auxiliary spindle, said supplemental cam being effective to open said master clutch upon movement of said auxiliary spindle in its extreme protracted position.

45. In a boring machine, in combination, an upright support, a headstock movable on said support, a feed screw for said headstock, means for driving said feed screw, said means including a reversing clutch, a pair of parallel spaced plungers, one of said plungers being spring-pressed upwardly for engagement by said headstock upon movement of the latter into its extreme lower position, the other of said plungers extending above said headstock for engagement thereby upon movement of said headstock into its upper extreme position, said plungers having opposed cam notches in their adjacent sides, and a pin disposed between said plungers and operatively connected to said reversing clutch and movable into one or the other of said notches upon actuation of said clutch in the corresponding direction.

46. In a boring machine, in combination, a support, a tool unit movable on said support, a feed screw for said unit, means for driving said feed screw, said means including a reversing clutch, a pair of parallel spaced plungers, one of said plungers being spring-pressed outwardly for engagement by said unit upon movement of the latter into one extreme position, the other of said plungers extending beyond said unit for engagement thereby upon movement of said unit into the other extreme position, said plungers having opposed cam notches in their adjacent sides, and a pin operatively connected to said reversing clutch and movable into one or the other of said notches upon actuation of said clutch in the corresponding direction.

47. In a boring machine, in combination, a frame having parallel ways on opposite sides, a tool support mounted on the ways on one side for movement on said frame, a clamping plate for engaging the ways on the other side, a plunger slidably mounted in said plate and extending therethrough into said support, opposed abutments on said plunger, a clamping lever pivotally mounted in said support for engagement with said frame to clamp said support to said first mentioned ways, said lever having an arm with its end disposed in bearing engagement between said abutments, and means coacting with said plate for adjusting said plunger endwise.

48. In a boring machine, in combination, a column having two parallel vertical standards formed with outwardly facing ways on the adjacent edges at each side, a tool support mounted on the ways at one side for vertical movement between said standards, a clamping plate for engaging the ways at the other side, a plunger slidably mounted in said plate and extending into said support, a stop shoulder on said plunger, opposed abutments slidable on said plunger between said shoulder and said plate, one abutment engaging said shoulder, spring means urging the other abutment toward said first abutment, two clamping levers pivotally mounted in said support for engagement respectively with said standards to clamp said support to said ways, said levers having arms extending toward each other with the ends disposed between said abutments, and means coacting with said plate for adjusting said plunger endwise to clamp or release said support and said plate.

49. In a boring machine, in combination, a column having two parallel vertical standards formed with outwardly facing V-shaped ways on the adjacent edges at one side and with outwardly facing flat ways on the adjacent edges at the other side, a tool support mounted on said V-shaped ways for vertical movement between said standards, a clamping plate for engaging said flat ways, a plunger slidably keyed to said plate and extending centrally into said support, a peripheral bearing shoulder on said plunger, opposed peripheral abutments slidably mounted on said plunger between said shoulder and said plate, one abutment engaging said shoulder, spring means urging the other abutment toward said first abutment, two clamping levers pivotally mounted in said support for engagement respectively with said standards to clamp said support to said V-shaped ways, said levers having arms extending toward each other with the ends disposed between said abutments, and a nut adjustably threaded on the outer end of said plunger against said plate.

50. In a boring machine, in combination, a supporting frame, a tool support movably mounted on said frame in bearing engagement with one side, a clamp adjustably secured to said support for engagement with the other side of said frame, a clamping member mounted in said support for movement into engagement with said frame to secure said support thereto, and means adjustably mounted in said clamp for actuating said member and operable through coaction therewith to secure said clamp to said frame.

51. A boring machine comprising, in combination, a support, a machine unit on said support, said unit having an operable element, a power inlet shaft for said unit, said operable element having a drive connection with said shaft, power means including a reversing clutch for driving said shaft, said clutch having a neutral position, a second unit movable on said support, drive means for feeding said second unit, said drive means including a control clutch adapted to be opened and closed, means for actuating said reversing clutch, and means automatically operable upon movement of said reversing clutch from either operative position into neutral position to open said control clutch and upon movement of said reversing clutch into either operative position to close said control clutch.

In testimony whereof, I have hereunto affixed my signature.

KEITH F. GALLIMORE.